(12) United States Patent
Yamaguchi et al.

(10) Patent No.: US 11,036,662 B2
(45) Date of Patent: *Jun. 15, 2021

(54) INTERRUPT MONITORING SYSTEMS AND METHODS FOR FAILURE DETECTION FOR A SEMICONDUCTOR DEVICE

(71) Applicant: RENESAS ELECTRONICS CORPORATION, Tokyo (JP)

(72) Inventors: Kyohei Yamaguchi, Tokyo (JP); Daisuke Kawakami, Tokyo (JP); Hiroyuki Hamasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,759

(22) Filed: Mar. 2, 2020

(65) Prior Publication Data

US 2020/0201796 A1 Jun. 25, 2020

Related U.S. Application Data

(63) Continuation of application No. 16/151,161, filed on Oct. 3, 2018, now Pat. No. 10,614,008.

(30) Foreign Application Priority Data

Nov. 28, 2017 (JP) .............................. JP2017-227372

(51) Int. Cl.
*G06F 13/24* (2006.01)
*G06F 11/07* (2006.01)
(52) U.S. Cl.
CPC .......... *G06F 13/24* (2013.01); *G06F 11/0757* (2013.01)
(58) Field of Classification Search
CPC ............................ G06F 13/24; G06F 11/0757
See application file for complete search history.

(56) References Cited

U.S. PATENT DOCUMENTS 5,138,709 A   8/1992   Jones et al.
5,944,840 A   8/1999   Lever
(Continued)

FOREIGN PATENT DOCUMENTS

EP   2 824 573 A2   1/2015
JP   2000-330798 A   11/2000

OTHER PUBLICATIONS

U.S. PTO Non-Final Office Action issued in related parent U.S. Appl. No. 16/151,161, dated May 2, 2019.
(Continued)

*Primary Examiner* — Raymond N Phan
(74) *Attorney, Agent, or Firm* — McDermott Will & Emery LLP

(57) ABSTRACT

A semiconductor device includes an interrupt control circuit that receives a plurality of interrupt signals from the circuit blocks and outputs an interrupt request to the processor, and an interrupt monitoring circuit that corresponds to one of the interrupt signals and includes a setting circuit for setting a monitoring type and first and second monitoring periods. If the monitoring type indicates an asserted state of the interrupt signal, the interrupt monitoring circuit monitors the asserted state. If a first duration of the continuous asserted state exceeds the first monitoring period, the interrupt monitoring circuit detects the state as a failure. If the monitoring type indicates a negated state of the interrupt signal, the interrupt monitoring circuit monitors the negated state. If a second duration of the continuous negated state exceeds the second monitoring period, the interrupt monitoring circuit detects the state as a failure.

8 Claims, 19 Drawing Sheets

(56) References Cited

U.S. PATENT DOCUMENTS

| | | | |
|---|---|---|---|
| 6,112,274 | A | 8/2000 | Goe et al. |
| 6,553,443 | B1 | 4/2003 | Baqai et al. |
| 10,614,008 | B2* | 4/2020 | Yamaguchi ......... G06F 11/0757 |
| 2005/0154811 | A1 | 7/2005 | DeWitt et al. |
| 2005/0246466 | A1* | 11/2005 | Wright .................... G06F 13/24 |
| | | | 710/260 |
| 2011/0219157 | A1* | 9/2011 | Yamaguchi ............. G06F 13/24 |
| | | | 710/267 |
| 2012/0047402 | A1 | 2/2012 | Chen et al. |
| 2016/0350162 | A1* | 12/2016 | Schlagenhaft ...... G06F 11/0721 |

OTHER PUBLICATIONS

U.S. PTO Notice of Allowance issued in related parent U.S. Appl. No. 16/151,161, dated Nov. 29, 2019.
Related parent U.S. Appl. No. 16/151,161, filed Oct. 3, 2018.
Extended European Search Report dated Apr. 5, 2019, issued in corresponding European Patent Application No. 18206932.8.

* cited by examiner

INTERRUPT MONITORING SYSTEMS AND METHODS FOR FAILURE DETECTION FOR A SEMICONDUCTOR DEVICE

CROSS-REFERENCE TO RELATED APPLICATIONS

This is a Continuation of U.S. patent application Ser. No. 16/151,161 filed on Oct. 3, 2018, which claims the benefit of Japanese Patent Application No. 2017-227372 filed on Nov. 28, 2017 including the specification, drawings and abstract is incorporated herein by reference in their entirety.

BACKGROUND

The present invention relates to a semiconductor device and a failure detection method, for example, a semiconductor device that monitors an interrupt signal and a failure detection method.

Japanese Unexamined Patent Application Publication No. 2000-330798 discloses a technique of a controller for examining interrupt control on an interrupt signal from an input/output device to a processor. The interrupt controller in Japanese Unexamined Patent Application Publication No. 2000-330798 includes a register that keeps the history of the interrupt signal. After interrupt with the interrupt signal, the interrupt controller examines the interruption with reference to the contents of the register.

SUMMARY

In Japanese Unexamined Patent Application Publication No. 2000-330798, however, it is not assumed that interrupt signals have various kinds of errors.

Other problems and new features will be clarified by the description and the accompanying drawings of the present specification.

According to an embodiment, a semiconductor device detects a failure by monitoring the duration of a specific state of an interrupt signal according to a monitoring type set for each interrupt signal.

According to the embodiment, failures can be detected based on various kinds of errors of multiple interrupt signals.

DETAILED DESCRIPTION

Figure 1:
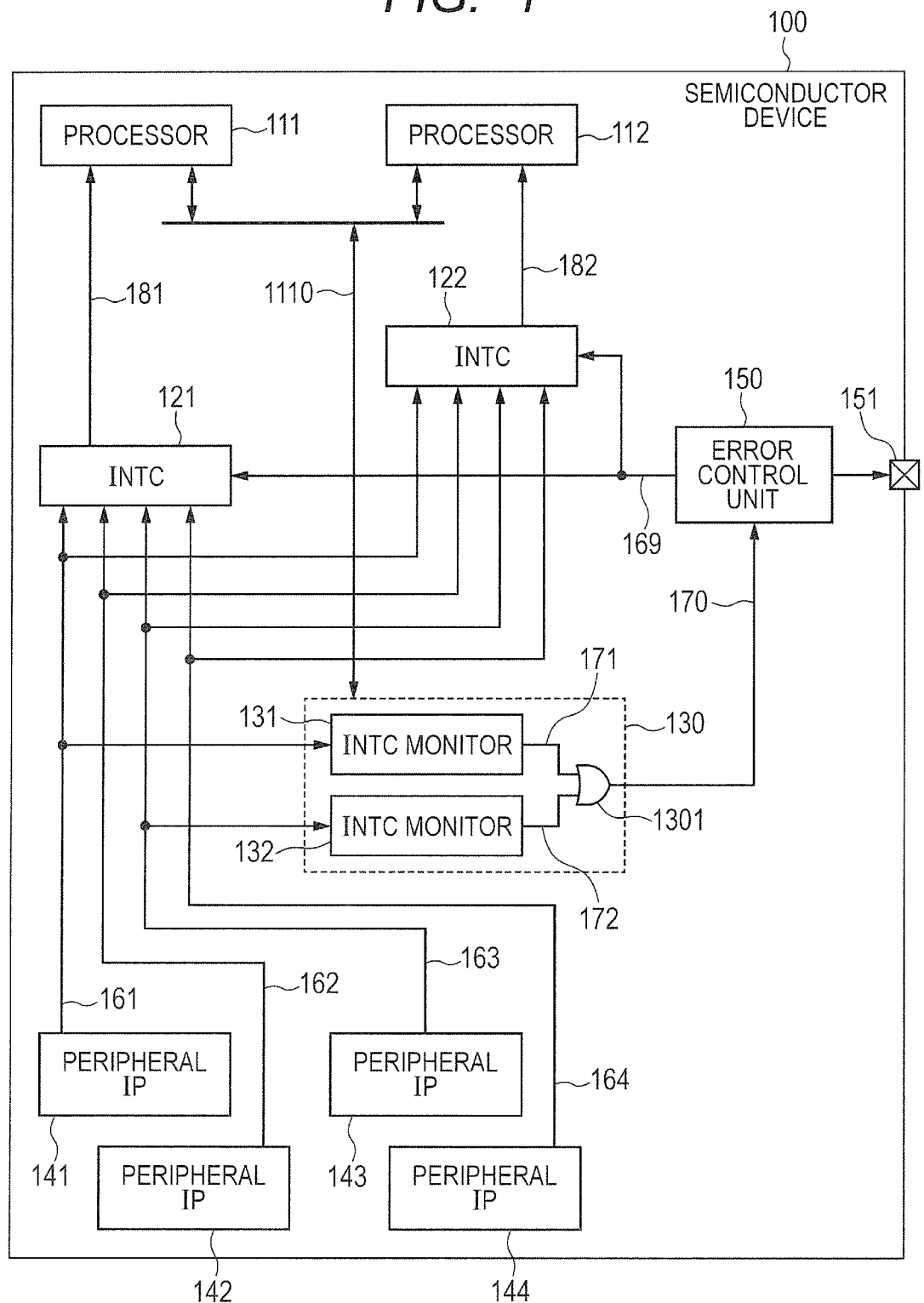
FIG. 1 is a block diagram showing the configuration of a semiconductor device according to a first embodiment.

For clarification of the explanation, the following description and drawings are optionally omitted and simplified. Moreover, elements illustrated as functional blocks for various kinds of processing in the drawings can be configured with hardware including a central processing unit (CPU), memory, and other circuits and software including programs loaded in the memory. Thus, a person skilled in the art could understand that these functional blocks can be implemented in various forms, for example, by hardware alone, software alone, or a combination of hardware and software. The forms of the functional blocks are not particularly limited. The same elements are indicated by the same reference numerals in the drawings and the redundant explanation is optionally omitted.

The programs can be provided for computers while being stored using various kinds of nontemporary computer-readable media. The nontemporary computer readable media include various kinds of substantial recording media. Examples of nontemporary computer readable media include a magnetic recording medium (e.g., a flexible disk, a magnetic tape, and a hard disk drive), a magneto-optical recording medium (e.g., a magneto-optical disk), a CD-ROM (Read Only Memory), a CD-R, a CD-R/W, and a semiconductor memory (e.g., a mask ROM, a PROM (Programmable ROM), an EPROM (Erasable PROM), a flash ROM, or a RAM (Random Access Memory)). The programs may be provided for computers by using various kinds of temporary computer-readable media. Examples of the temporary computer readable media include an electric signal, an optical signal, and an electromagnetic wave. The temporary computer-readable media can supply programs for computers through wire communication lines including an electric wire and an optical fiber, or radio communication lines.

First Embodiment

FIG. 1 is a block diagram showing the configuration of a semiconductor device 100 according to a first embodiment.

The semiconductor device 100 includes processors 111 and 112, interrupt controllers (INTCs) 121 and 122, an interrupt monitoring unit 130, and peripheral intellectual properties (IPs) 141 to 144. The processor 111 is a control circuit that performs a predetermined interrupt in response to an interrupt request 181. The processor 112 is a control circuit that performs a predetermined interrupt in response to an interrupt request 182. The peripheral IPs 141 to 144 are circuit blocks that respectively output interrupt signals 161 to 164. The peripheral IPs 141 and 143 are set at relatively high functional safety levels. The peripheral IPs 142 and 144 are set at lower functional safety levels than the peripheral IPs 141 and 143. Thus, the interrupt signals 161 and 163 outputted from the peripheral IPs 141 and 143 are placed at relatively high monitoring priority. Moreover, the interrupt signals 162 and 164 outputted from the peripheral IPs 142 and 144 are placed at relatively low monitoring priority. Thus, in an example of the present embodiment, the interrupt signals 161 and 163 are monitored and the interrupt signals 162 and 164 are not monitored. However, even the interrupt signal at low monitoring priority may be monitored. Furthermore, even the interrupt signal at high monitoring priority may not be monitored. In other words, in the present embodiment, the signals to be monitored are not limited as long as at least one of the interrupt signals 161 and 163 is monitored. The number of peripheral IPs and the number of interrupt signals are not limited. For example, several hundreds interrupt signals may be outputted from the peripheral IPs. Moreover, the ratio of the peripheral IPs at high functional safety levels and the peripheral IPs at low functional safety levels is not limited. Furthermore, the semiconductor device 100 according to the present embodiment only requires at least one peripheral IP that outputs the interrupt signal to be monitored. The number of processors and the number of INTCs are not limited in the present embodiment.

The INTC 121 is an interrupt control circuit that receives multiple interrupt signals and outputs the interrupt request 181 to the processor 111. In this configuration, the INTC 121 is coupled to signal lines for the interrupt signals 161 to 164 from the respective peripheral IPs 141 to 144 and a signal line for an interrupt signal 169 from an error control unit 150. The interrupt signals 161 and 163 are set as targets of interrupt in the INTC 121. Thus, the INTC 121 outputs the interrupt request 181 to the processor 111 in response to the interrupt signal 161 or 163. In other words, even when receiving the interrupt signals 162, 164, and 169 that are not set as targets of interrupt, the INTC 121 does not output an interrupt request.

The INTC 122 is an interrupt control circuit that receives multiple interrupt signals and outputs the interrupt request 182 to the processor 112. In this configuration, the INTC 122 is coupled to signal lines for the interrupt signals 161 to 164 from the respective peripheral IPs 141 to 144 and a signal line for the interrupt signal 169 from the error control unit 150. The interrupt signals 162, 164, and 169 are set as targets of interrupt in the INTC 122. Thus, the INTC 122 outputs the interrupt request 182 to the processor 112 in response to the interrupt signal 162, 164, or 169. In other words, even when receiving the interrupt signals 161 and 163 that are not set as targets of interrupt, the INTC 122 does not output an interrupt request. Specifically, the internal settings of the INTC 121 and the INTC 122 can optionally change the combinations of the interrupt signals as targets of interrupt in the INTC 121 and the INTC 122. The INTC 121 is an example of a first interrupt control circuit, which will be discussed later. The INTC 122 is an example of a second interrupt control circuit, which will be discussed later. The interrupt monitoring unit 130 includes INTC monitors 131 and 132, which are interrupt monitoring circuits for the respective interrupt signals, and an OR circuit 1301. In this case, the INTC monitor 131 corresponds to the interrupt signal 161 and the INTC monitor 132 corresponds to the interrupt signal 163.

The INTC monitor 131 monitors a state of the interrupt signal 161. If an abnormality is detected, the INTC monitor 131 outputs a failure notification signal 171. The INTC monitor 132 monitors a state of the interrupt signal 163. If an abnormality is detected, the INTC monitor 132 outputs a failure notification signal 172. The OR circuit 1301 outputs the result of the logical sum of the failure notification signals 171 and 172 as a failure notification signal 170. As has been discussed in the present embodiment, at least one interrupt signal may be outputted as a target of interrupt. Thus, the interrupt monitoring unit 130 may include at least one INTC monitor. In this case, the OR circuit 1301 is not necessary. In the case of three or more interrupt signals to be monitored, the INTC monitors as many as the interrupt signals may be provided for the respective interrupt signals.

Figure 2:
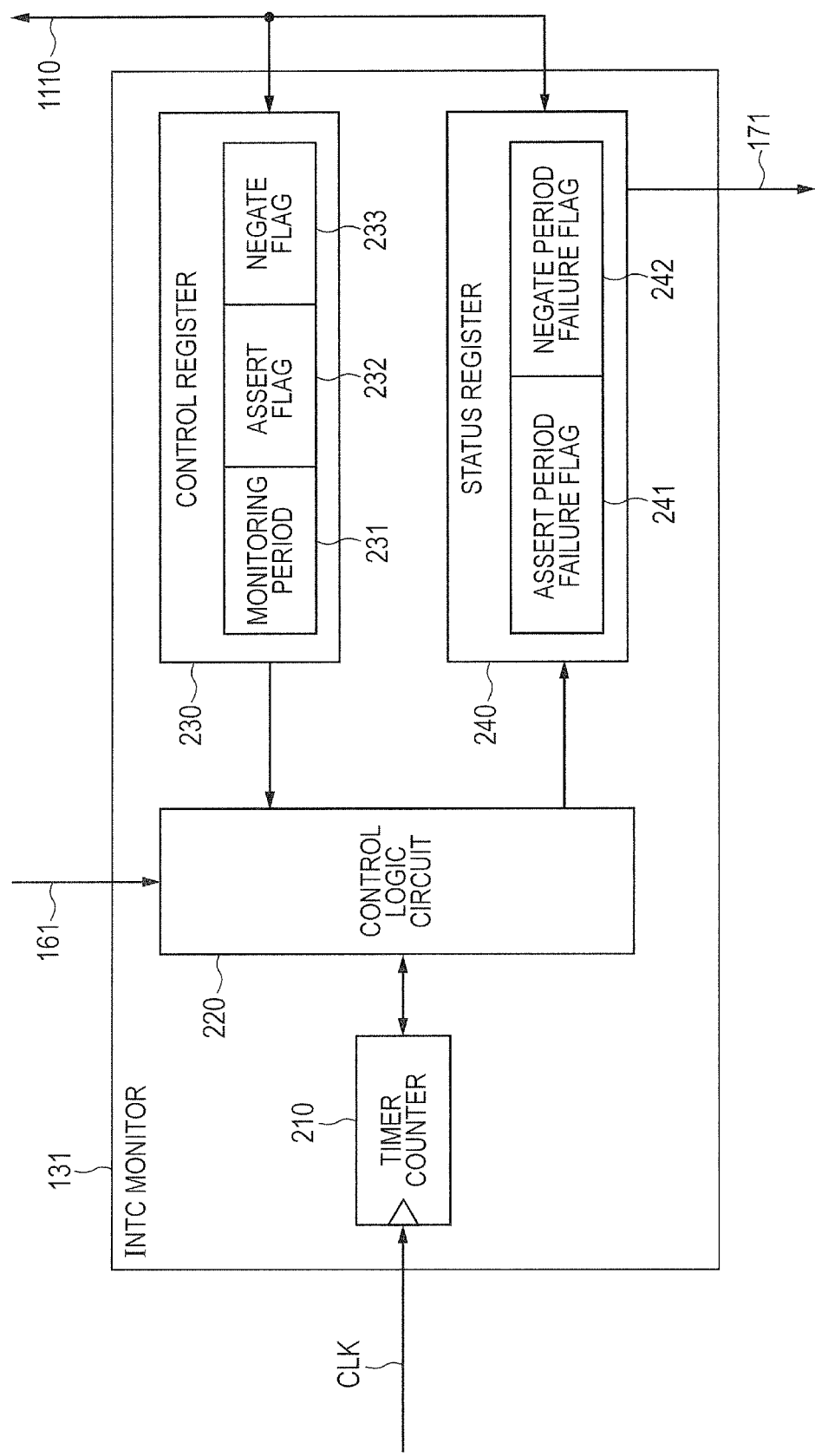
FIG. 2 is a block diagram showing the configuration of an INTC monitor according to the first embodiment.

Referring to FIG. 2, the internal configuration of the INTC monitors 131 will be described below. FIG. 2 is a block diagram showing the configuration of the INTC monitor 131 according to the first embodiment. The configuration of the INTC monitor 132 is identical to that of the INTC monitor 131 and thus the illustration and explanation thereof are omitted.

The INTC monitor 131 includes a timer counter 210, a control logic circuit 220, a control register 230, and a status register 240. The timer counter 210 measures the durations of an assert state and a negate state of the interrupt signal 161 based on a clock signal CLK. The clock signal CLK may be a low-speed (kHz level) clock signal obtained with a divided operation clock frequency. This is because a monitoring period is quite long (msec) relative to the operation clock frequency.

The control register 230 is an example of a setting circuit for setting a monitoring period 231, an assert flag 232, and a negate flag 233. The monitoring period 231 is a time as a threshold value indicating that the durations of the assert state and the negate state of the interrupt signal 161 are set within a normal range. The monitoring period 231 corresponds to a state where a first monitoring period and a second monitoring period are common periods. The assert flag 232 is flag information indicating whether the INTC monitor 131 monitors the assert state of the interrupt signal 161. The negate flag 233 is flag information indicating whether the INTC monitor 131 monitors the negate state of the interrupt signal 161. The assert flag 232 and the negate flag 233 are examples of monitoring types that indicate the monitoring state of the corresponding interrupt signal 161. Thus, the assert flag 232 and the negate flag 233 may be collectively denoted as a piece of monitoring type information and whether to monitor both of the assert state and the negate state of the interrupt signal 161 may be controlled in response to ON/OFF of the monitoring type information.

The status register 240 is a holding circuit that holds an assert period failure flag 241 and a negate period failure flag 242. In the assert period failure flag 241, if the duration of the assert state of the interrupt signal 161 exceeds the monitoring period 231, a value (e.g., 1) indicating the detection of a failure is set by the control logic circuit 220. In the negate period failure flag 242, if the duration of the negate state of the interrupt signal 161 exceeds the monitoring period 231, a value (e.g., 1) indicating the detection of a failure is set by the control logic circuit 220.

In the control register 230 and the status register 240, a set value is read and write by a processor IO signal 1110 from the outside, for example, the processor 111 or 112. In other words, the processor 111 or 112 can set and refer to the set values of the control register 230 and the status register 240. Moreover, the assert period failure flag 241 and the negate period failure flag 242 of the status register 240 are outputted as the failure notification signal 171.

The control logic circuit 220 starts monitoring the interrupt signal 161 when the assert flag 232 or the negate flag 233 is set in the control register 230. The control logic circuit 220 detects a change of the assert state and the negate state of the interrupt signal 161. Each time the control logic circuit 220 detects a change of the interrupt signal 161, the control logic circuit 220 switches monitoring of the assert state and the negate state according to the settings of the assert flag 232 and the negate flag 233.

Specifically, if the interrupt signal 161 is asserted when a monitoring type is set as an assert state in the setting circuit (For example, 1 is set in the assert flag 232 by the processor 111 and the like), the control logic circuit 220 starts measuring a first duration by means of the timer counter 210. Moreover, if the interrupt signal 161 is negated when the monitoring type is set as a negate state in the setting circuit (For example, 1 is set in the negate flag 233 by the processor 111 and the like), the control logic circuit 220 starts measuring a second duration by means of the timer counter 210.

The control logic circuit 220 is an example of a control circuit that detects assertion and negation of the interrupt signal 161. If the start of the assertion of the interrupt signal 161 is detected, the control logic circuit 220 clears the timer counter 210 and then compares the measured value of the timer counter 210 as the first duration with the monitoring period 231. If the first duration exceeds the monitoring period 231, the control logic circuit 220 detects the duration as a failure and sets a failure detection value (e.g., 1) in the assert period failure flag 241 of the status register 240.

If the start of the negation of the interrupt signal 161 is detected, the control logic circuit 220 clears the timer counter 210 and then compares the measured value of the timer counter 210 as a second duration with the monitoring period 231. If the second duration exceeds the monitoring period 231, the control logic circuit 220 detects the duration as a failure and sets a failure detection value (e.g., 1) in the negate period failure flag 242 of the status register 240.

The explanation will be continued from FIG. 1. The error control unit 150 receives notification of failure detection from the INTC monitors 131 and 132 as the failure notification signal 170, and outputs the notification of detection as the interrupt signal 169. The error control unit 150 can select, as a destination of the output, the INTCs 121 and 122 and/or an external terminal 151. Thus, if the error control unit 150 outputs the notification of failure detection to the external terminal 151, the failure can be detected by, for example, an external monitor of the semiconductor device 100. Subsequently, various fail operations are performed according to error information from the external terminal 151. For example, power on reset is performed on the semiconductor device 100.

The failure notification signal 170 indicates that a failure is detected by at least one of the INTC monitors. The failure notification signal 170 may include information for specifying the INTC monitor, which has detected a failure, or the interrupt signal. Furthermore, the failure notification signal 170 may include information for specifying whether a failure has been detected in the assert period or the negate period.

In this case, the error control unit 150 outputs the interrupt request 169 to both of the INTCs 121 and 122. As described above, even if the INTC 121 receives the interrupt signal 169, the interrupt signal 169 is not set as a target of interrupt and thus is not notified as the interrupt request 181 to the processor 111. In this configuration, the INTC 121 sets, as targets of interrupt, the interrupt signals 161 and 163 to be monitored. If the interrupt signal 169 indicates failure detection, a failure may occur in one of the peripheral IPs 141 and 143, which are blocks for the interrupt signals 161 and 163, the INTC 121, and the processor 111. This may not properly perform an interrupt in the processor 111. Thus, if the interrupt signals 161 and 163 are to be monitored, the interrupt signal 169 is not set as a target of interrupt in the INTC 121. If the INTC 122 receives the interrupt signal 169, the interrupt signal 169 is set as a target of interrupt and thus is notified as the interrupt request 182 to the processor 112. Thus, in response to the interrupt request 182, the processor 112 refers to the status registers 240 of the INTC monitors 131 and 132, specifies the interrupt signal indicating abnormality detection (or the peripheral IP from which the signal is outputted), and specifies whether the assert period or the negate period has exceeded the monitoring period. Moreover, the processor 112 writes the specified information in DRAM (not shown). Subsequently, a fail operation is performed according to the specified information. For example, software may be reset for the specified peripheral IP so as to make a recovery from a failure. The error notification and recovery is merely exemplary.

In another example of error notification, the INTC monitors 131 and 132 may notify both of the INTCs 121 and 122 of failure detection as well as information for identifying the INTC monitors, the interrupt signal, or the peripheral IP from which the signal is outputted. In this case, the INTCs 121 and 122 may each analyze the notification of failure detection to decide whether to notify the processor of an error. If it is decided that an error is to be notified from the INTC, the INTC may output the interrupt request to the processor. This can perform processing such as a recovery in the proper processor.

Alternatively, the INTC monitors 131 and 132 may output the failure notification signal 171 or a failure notification signal 172 as well as information for identifying the INTC monitors, the interrupt signal, or the peripheral IP from which the signal is outputted, so that the error control unit 150 can specify, based on the failure notification signal 170, the INTC monitor at the location of the failure, the interrupt signal, or the peripheral IP from which the signal is outputted. In this case, the error control unit 150 may have, for example, the definitions of the interrupt signals set for the INTCs 121 and 122. The error control unit 150 may output the interrupt signal to the INTC 121 or 122 bases on the specified information and the definitions.

As has been discussed, in the present embodiment, the two systems are provided for notification of the interrupt signals. Specifically, in the first system, the interrupt signals 161 and 163 from the peripheral IPs 141 and 143 are notified to the INTC 121 and then the INTC 121 notifies the processor 111 of the interrupt request 181 in response to the interrupt signal 161 or 163. In the second system, the INTC 122 is notified of the interrupt signals 162 and 164 from the peripheral IPs 142 and 144 and the interrupt signal 169 from the error control unit 150 and then the INTC 122 notifies the processor 112 of the interrupt request 182 in response to the interrupt signal 162, 164 or 169.

If an abnormality is detected in the interrupt signal 161 or 163, there is a high probability of a failure in the peripheral IP 141 or 143, the INTC 121, the processor 111, or related signal lines in the first system. Thus, if an abnormality is detected in the interrupt signal 161 or 163 of the first system, the failure detection is notified to the second system, which is free from abnormalities, instead of the first system. This enables recovery thereafter.

Figure 3:
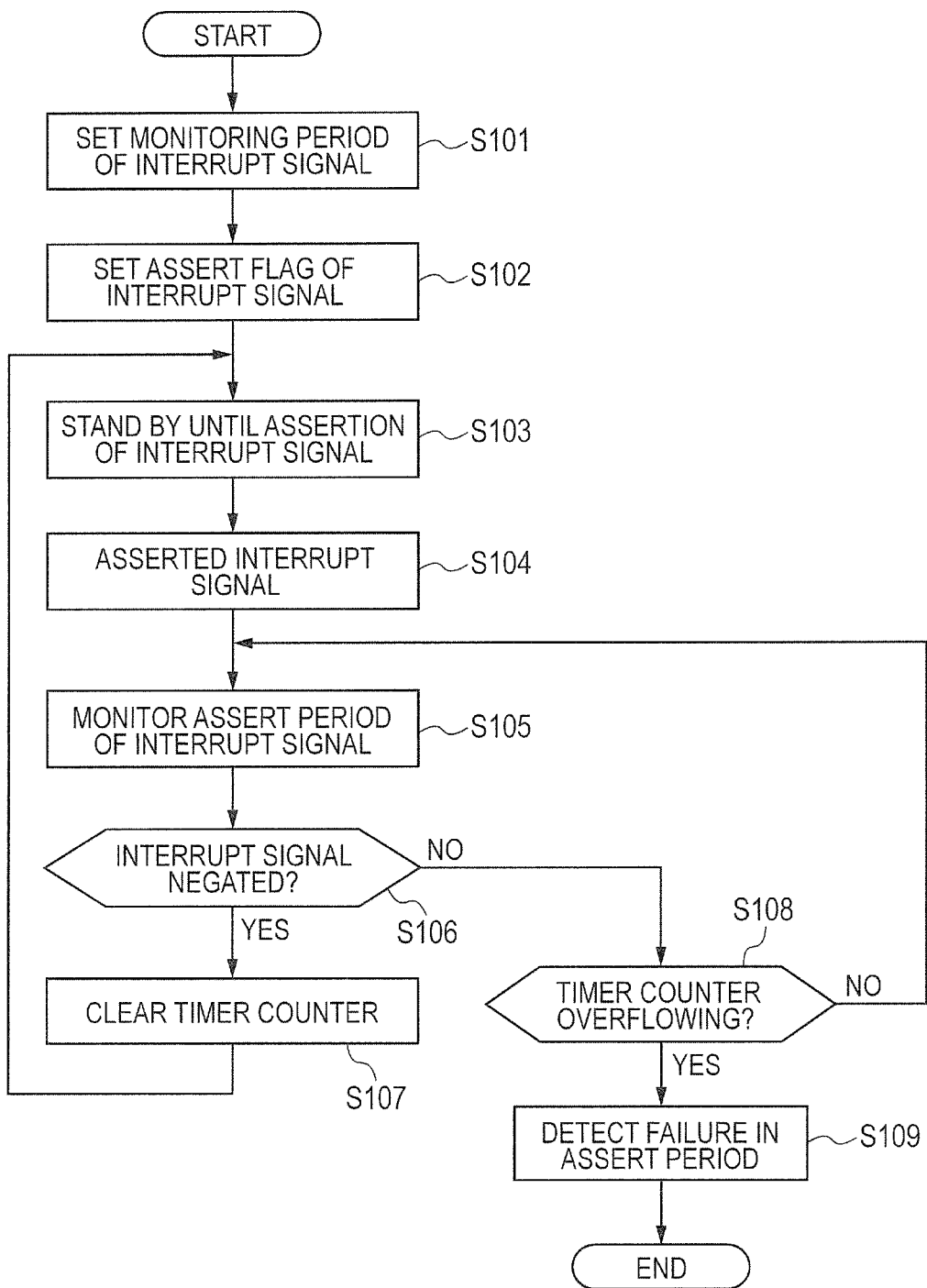
FIG. 3 is a flowchart showing the flow of monitoring the assert period of an interrupt signal according to the first embodiment.
Figure 4:
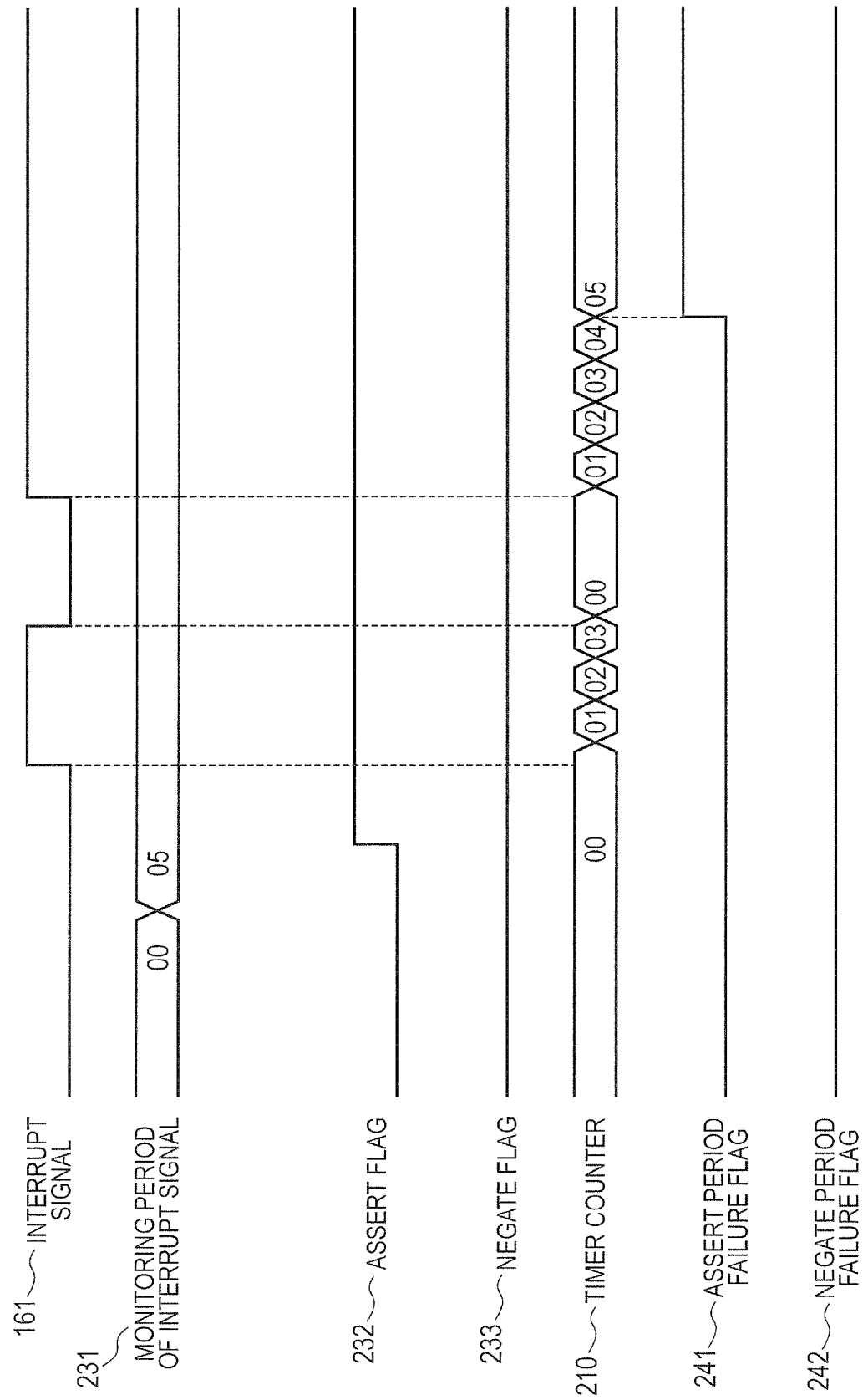
FIG. 4 is a timing chart when the assert period of the interrupt signal is monitored according to the first embodiment.

Subsequently, monitoring of only the assert period will be discussed below as abnormality detection of the interrupt signal. FIG. 3 is a flowchart showing the flow of monitoring the assert period of the interrupt signal according to the first embodiment. In the following description, processing on the INTC monitor 131 for monitoring the interrupt signal 161 will be discussed. Moreover, in the following description, the interrupt signal 161 at the start is negated as shown in FIG. 4, which will be discussed later.

First, the processor 111 or the like sets the monitoring period of the interrupt signal 161 (S101). Specifically, the processor 111 or the like sets the monitoring period 231 in the control register 230 of the INTC monitor 131.

Then, the processor 111 or the like sets the assert flag of the interrupt signal 161 (S102). Specifically, the processor 111 or the like sets 1 in the assert flag 232 of the control register 230 of the INTC monitor 131. Moreover, 0 is continuously set in the negate flag 233.

The INTC monitor 131 then stands by until the interrupt signal 161 is asserted (S103). Thereafter, the interrupt signal 161 is asserted (S104). At this point, the control logic circuit 220 of the INTC monitor 131 detects the assertion of the interrupt signal 161 and starts measuring the first duration by means of the timer counter 210. Then, the INTC monitor 131 monitors the assert period of the interrupt signal 161 (S105). The control logic circuit 220 of the INTC monitor 131 decides whether the interrupt signal 161 has been negated or not (S106). If the control logic circuit 220 detects the start of negation of the interrupt signal 161, the control logic circuit 220 clears the timer counter 210 (S107) and then returns to step S103.

In step S106, if the control logic circuit 220 has not detected the start of negation of the interrupt signal 161, the control logic circuit 220 decides whether the timer counter 210 has overflown or not (S108). Specifically, the control logic circuit 220 compares the measured value of the timer counter 210, that is, the first duration in which the interrupt signal 161 is continuously asserted, and the monitoring period 231. If it is decided that the first duration exceeds the monitoring period 231, the control logic circuit 220 detects a failure in the assert period (S109). Specifically, the control logic circuit 220 sets 1 in the assert period failure flag 241 of the status register 240. In step S108, if it is decided that the timer counter 210 has not overflown, the process returns to step S105.

FIG. 4 is a timing chart when the assert period of the interrupt signal is monitored according to the first embodiment. In FIG. 4, 5 msec is set as the monitoring period 231, the assert flag is set, and the negate flag 233 is not set. The first assert period of the interrupt signal 161 is not longer than 3 msec and thus does not exceed the monitoring period 231, indicating that the timer counter 210 is cleared. The second assert period of the interrupt signal 161 exceeds 5 msec, that is, the monitoring period 231 and thus 1 is set in the assert period failure flag 241. Hereinafter, failure detection is notified through the error control unit 150.

In FIG. 4, only the assert period of the interrupt signal is monitored and the interrupt signal is negated during the setting of the assert flag 232, that is, at the start of monitoring. In this case, as described above, the monitoring of the interrupt signal is placed on hold as in step S103 until the interrupt signal is asserted in step S104 of FIG. 3.

The present embodiment is also applicable in the case where only the assert period of the interrupt signal is monitored and the interrupt signal is asserted during the setting of the assert flag 232. In this case, immediately after the setting of the assert flag 232, the control logic circuit 220 of the INTC monitor 131 detects the assertion of the interrupt signal 161 and then starts measuring the first duration by means of the timer counter 210. Thus, even if the assert flag 232 is set during an operation of the semiconductor device 100, monitoring can be instantly started so as to more quickly detect a failure.

Moreover, only the negate period of the interrupt signal may be monitored. In this case, the interrupt signal may be asserted or negated during the setting of the negate flag 233, that is, at the start of monitoring. If the interrupt signal is asserted during the setting of the negate flag 233, the monitoring of the interrupt signal is held until the interrupt signal is negated. If the interrupt signal is negated during the setting of the negate flag 233, immediately after the setting of the negate flag 233, the control logic circuit 220 of the INTC monitor 131 detects the negation of the interrupt signal 161 and starts measuring the second duration of the timer counter 210. Thus, even if the negate flag 233 is set during an operation of the semiconductor device 100, monitoring can be instantly started so as to more quickly detect a failure.

Figure 5:
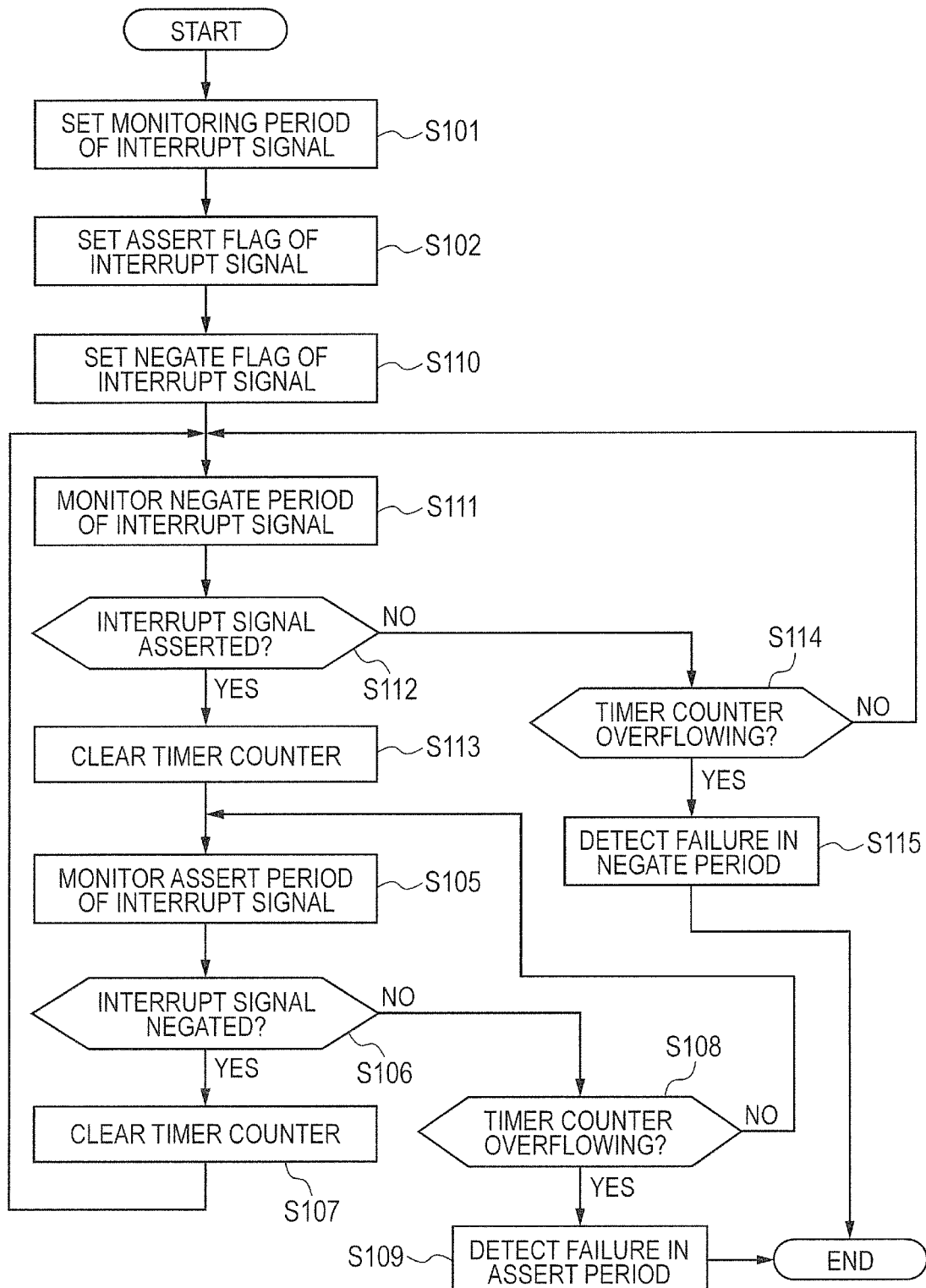
FIG. 5 is a flowchart showing the flow of monitoring the assert period and the negate period of the interrupt signal according to the first embodiment.
Figure 6:
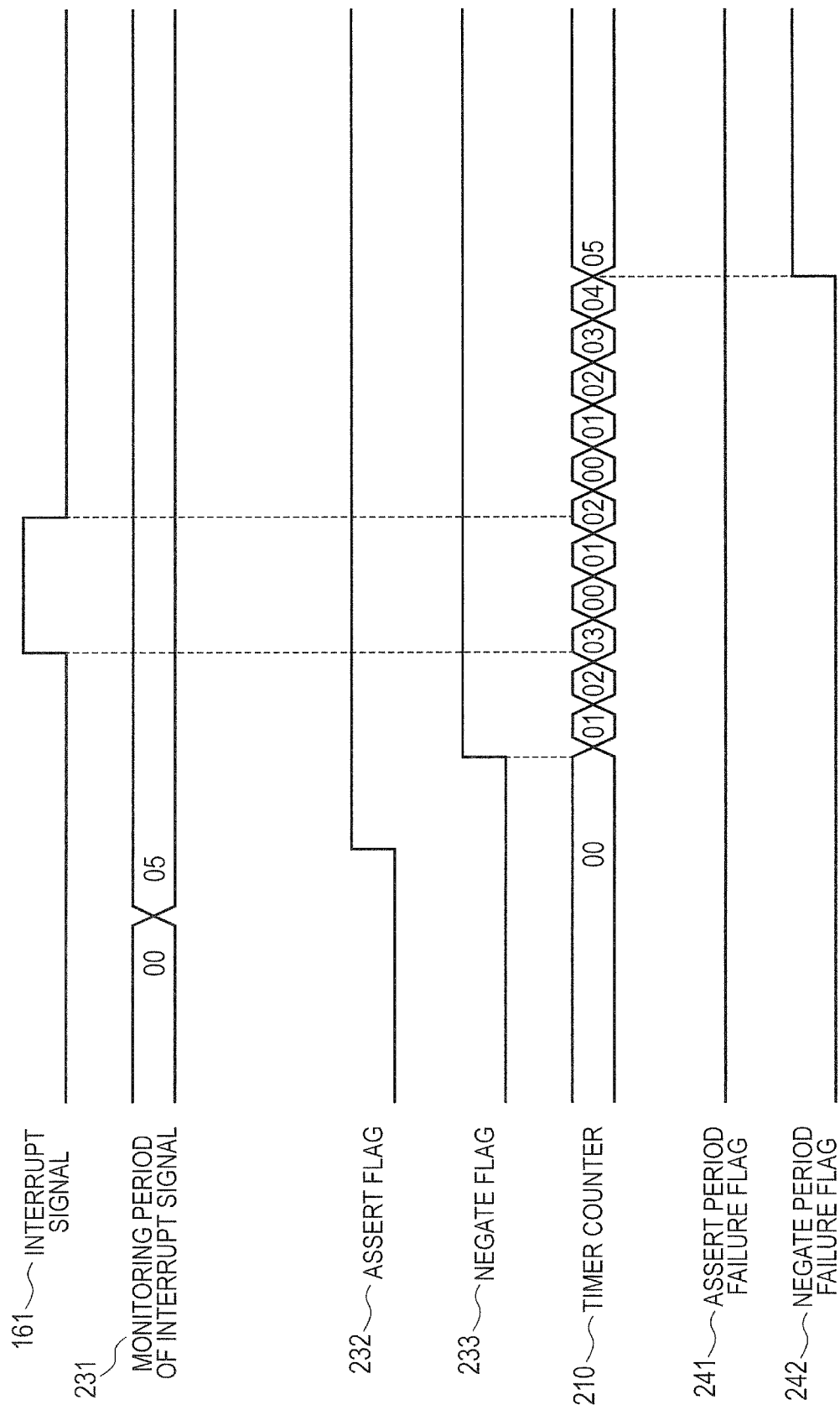
FIG. 6 is a timing chart when the assert period and the negate period of the interrupt signal are monitored according to the first embodiment.

Subsequently, the monitoring of the assert period and the negate period will be discussed below as abnormality detection of the interrupt signal. FIG. 5 is a flowchart showing the flow of monitoring the assert period and the negate period of the interrupt signal according to the first embodiment. Moreover, in the following description, the interrupt signal 161 at the start is negated as shown in FIG. 6, which will be discussed later.

The processor 111 or the like sets the monitoring period of the interrupt signal 161 (S101). Then, the processor 111 or the like sets the assert flag of the interrupt signal 161 (S102). Specifically, the processor 111 or the like sets 1 in the assert flag 232 of the control register 230 of the INTC monitor 131.

Then, the processor 111 or the like sets the negate flag of the interrupt signal 161 (S110). Specifically, the processor 111 or the like sets 1 in the negate flag 233 of the control register 230 of the INTC monitor 131.

The INTC monitor 131 starts monitoring the interrupt signal 161 from when the assert flag 232 and the negate flag 233 are set at 1 (S111). At this point, as described above, the interrupt signal 161 is negated and thus the control logic circuit 220 of the INTC monitor 131 detects the negation of the interrupt signal 161 and starts measuring the second duration by means of the timer counter 210. In the following description, the INTC monitor 131 will be mainly discussed.

The control logic circuit 220 of the INTC monitor 131 decides whether the interrupt signal 161 has been asserted or not (S112). If the control logic circuit 220 has not detected the start of assertion of the interrupt signal 161, the control logic circuit 220 decides whether the timer counter 210 has overflown or not (S114). Specifically, the control logic circuit 220 compares the measured value of the timer counter 210, that is, the second duration in which the interrupt signal 161 is continuously negated, and the monitoring period 231. If it is decided that the second duration exceeds the monitoring period 231, the control logic circuit 220 detects a failure in the negate period (S115). Specifically, the control logic circuit 220 sets 1 in the negate period failure flag 242 of the status register 240. In step S114, if it is decided that the timer counter 210 has not overflown, the process returns to step S111.

If the control logic circuit 220 detects the start of assertion of the interrupt signal 161 in step S112, the control logic circuit 220 clears the timer counter 210 (S113) and then starts measuring the first duration by means of the timer counter 210.

Then, the INTC monitor 131 monitors the assert period of the interrupt signal 161 (S105). The control logic circuit 220 of the INTC monitor 131 decides whether the interrupt signal 161 has been negated or not (S106). If the control logic circuit 220 detects the start of negation of the interrupt signal 161, the control logic circuit 220 clears the timer counter 210 (S107) and then returns to step S111.

If the control logic circuit 220 does not detect the start of negation of the interrupt signal 161 in step S106, the process advances as in FIG. 3.

FIG. 6 is a timing chart showing the monitoring of the assert period and the negate period of the interrupt signal according to the first embodiment. In FIG. 6, 5 msec is set as the monitoring period 231, the assert flag is set, and then the negate flag 233 is set. Then, immediately after the setting of the negate flag 233, the measurement of the negate period is started and the interrupt signal is asserted in the monitoring period 231. The assert period also indicates negation within the monitoring period 231. Thereafter, the second negate period of the interrupt signal 161 exceeds 5 msec, that is, the monitoring period 231 and thus 1 is set in the negate period failure flag 242. Hereinafter, failure detection is notified through the error control unit 150.

In FIG. 6, both of the assert period and the negate period of the interrupt signal are monitored and the interrupt signal is negated during the setting of the assert flag 232 and the negate flag 233, that is, at the start of monitoring. The present embodiment is also applicable in the case where both of the assert period and the negate period of the interrupt signal are monitored and the interrupt signal is asserted during the setting of the assert flag 232 and the negate flag 233. In this case, immediately after the setting of the assert flag 232 and before the setting of the negate flag 233, the control logic circuit 220 of the INTC monitor 131 detects the assertion of the interrupt signal 161 and then starts measuring the first duration by means of the timer counter 210. Thus, even if the assert flag 232 and the negate flag 233 are set during an operation of the semiconductor device 100, monitoring can be instantly started so as to more quickly detect a failure.

If the assert period or the negate period of the interrupt signal exceeds a predetermined monitoring period, it can be decided that a failure has occurred in the series of systems including the peripheral IP from which the interrupt signal is outputted, the interrupt control circuit to which the interrupt signal is outputted, and the processor.

Furthermore, in the present embodiment, the control register 230 and the timer counter 210 are provided for each interrupt signal, thereby setting a proper monitoring period in view of the characteristic of each interrupt signal. For example, in the case of signal processing for televisions and videos, real-time data needs to be processed at 30 fps. For example, in the presence of the interrupt signal to be always asserted for each frame, a time equivalent to at least one frame is set as the monitoring period 231 of the control register 230, thereby immediately detecting an abnormality in interrupt control.

According to the present embodiment, the INTC monitor can be provided for each interrupt signal and a monitoring type and a monitoring period can be set for each interrupt signal. Thus, failures can be detected based on various kinds of errors of multiple interrupt signals.

The present embodiment can be also expressed as follows: The semiconductor device 100 includes the first processor 111, the circuit blocks (peripheral IPs 141 and 143), the first interrupt control circuit (INTC 121), and the at least one interrupt monitoring circuit (INTC monitor 131 or 132).

In this configuration, the first processor 111 performs a predetermined interrupt in response to an interrupt request. The circuit blocks output the interrupt signals 161 to 163, respectively. The first interrupt control circuit receives multiple interrupt signals from the circuit blocks and outputs the interrupt request 181 to the first processor 111. At least one of the interrupt monitoring circuits corresponds to at least one of the interrupt signals 161 and 163 and includes the setting circuit (control register 230) for setting a monitoring type (the assert flag 232 and the negate flag 233) indicating the monitoring state of the corresponding interrupt signal and the first and second monitoring periods (monitoring period 231). If the monitoring type indicates the asserted state of the interrupt signal, the interrupt monitoring circuit monitors the asserted state. If the first duration, in which the interrupt signal is continuously asserted, exceeds the first monitoring period, the interrupt monitoring circuit detects the state as a failure. If the monitoring type indicates the negated state of the interrupt signal, the interrupt monitoring circuit monitors the negated state. If the second duration, in which the interrupt signal is continuously negated, exceeds the second monitoring period, the interrupt monitoring circuit detects the state as a failure. This can specifically set a monitoring type and a monitoring period for each interrupt signal, so that various kinds of errors occurring in response to the interrupt signals can be detected as failures.

The interrupt monitoring circuit desirably starts monitoring the interrupt signal when a monitoring type is set for the setting circuit of the interrupt monitoring circuit. Moreover, the interrupt monitoring circuit desirably switches monitoring of the asserted state and the negated state each time a change of the state of the interrupt signal is detected. Thus, a failure can be detected in a proper monitoring period according to the state of the interrupt signal.

The interrupt monitoring circuit desirably starts monitoring the first duration if the interrupt signal is asserted when the monitoring type is set as an asserted state in the setting circuit. Furthermore, the interrupt monitoring circuit desirably starts measuring the second duration if the interrupt signal is negated when the monitoring type is set as a negated state in the setting circuit. This can instantly start monitoring according to the setting of the monitoring type, thereby quickly detecting a failure.

The semiconductor device desirably further includes the second processor 112, the error control unit 150 that outputs a notification of detection as the interrupt signal 169, and the second interrupt control circuit (INTC 122) that receives the interrupt signal 169 from the error control unit 150 and outputs the signal as the interrupt request 182 to the processor 112. Thus, if a failure is detected from the interrupt signal, the failure can be notified through the system free of failures, among the systems including the INTCs for notification of the interrupt requests and the processors. This can accurately analyze the cause of the failure.

The interrupt monitoring circuit further includes the timer counter 210 that measures the first duration and the second duration based on an operation clock, and the control circuit (control logic circuit 220) that detects the assertion and negation of the interrupt signal. If the assertion is detected, the control circuit desirably clears the timer counter 210 and then compares the measured value of the timer counter 210 as the first duration with the first monitoring period. If the negation is detected, the control circuit desirably clears the timer counter 210 and then compares the measured value of the timer counter 210 as the second duration with the second monitoring period. Thus, the durations of assertion and negation are alternately measured so as to properly detect a failure.

In this case, the interrupt signals include the first interrupt signal 161 and the second interrupt signal 163. The semiconductor device desirably further includes the first interrupt monitoring circuit (INTC monitor 131) corresponding to the first interrupt signal 161 and the second interrupt monitoring circuit (INTC monitor 132) corresponding to the second interrupt signal 163. Thus, a failure can be properly detected for each of the interrupt signals.

Moreover, the first interrupt monitoring circuit outputs the first failure notification signal 171 if a failure is detected by monitoring the first interrupt signal, whereas the second interrupt monitoring circuit outputs the second failure notification signal 172 if a failure is detected by monitoring the second interrupt signal. The semiconductor device preferably further includes the OR circuit 1301 that outputs the logical sum of the first and second failure notification signals 171 and 172 as the third failure notification signal 170. Thus, the interrupt signals can be collectively monitored to detect failures.

Furthermore, the semiconductor device includes the M interrupt monitoring circuits (M is a positive integer), M is smaller than the total of the interrupt signals. The M interrupt monitoring circuits are provided for the respective M signals of the interrupt signals. Thus, failures can be detected preferentially from some of the interrupt signals, achieving flexible monitoring.

Moreover, the circuit blocks include the M first circuit blocks and the second circuit blocks at lower functional safety levels than the first circuit blocks. The M interrupt monitoring circuits are provided for the respective interrupt signals outputted from the M first circuit blocks. Thus, only the important interrupt signals in view of functional safety are monitored, thereby suppressing the circuit size.

Second Embodiment

A second embodiment is a modification of the first embodiment. In the second embodiment, a control register in an INTC monitor has an area for storing a reset flag. The reset flag is a value set for optionally resetting a timer counter value by a user. In the second embodiment, configurations other than the INTC monitor are identical to those of the first embodiment and thus the illustration and explanation thereof are omitted.

Figure 7:
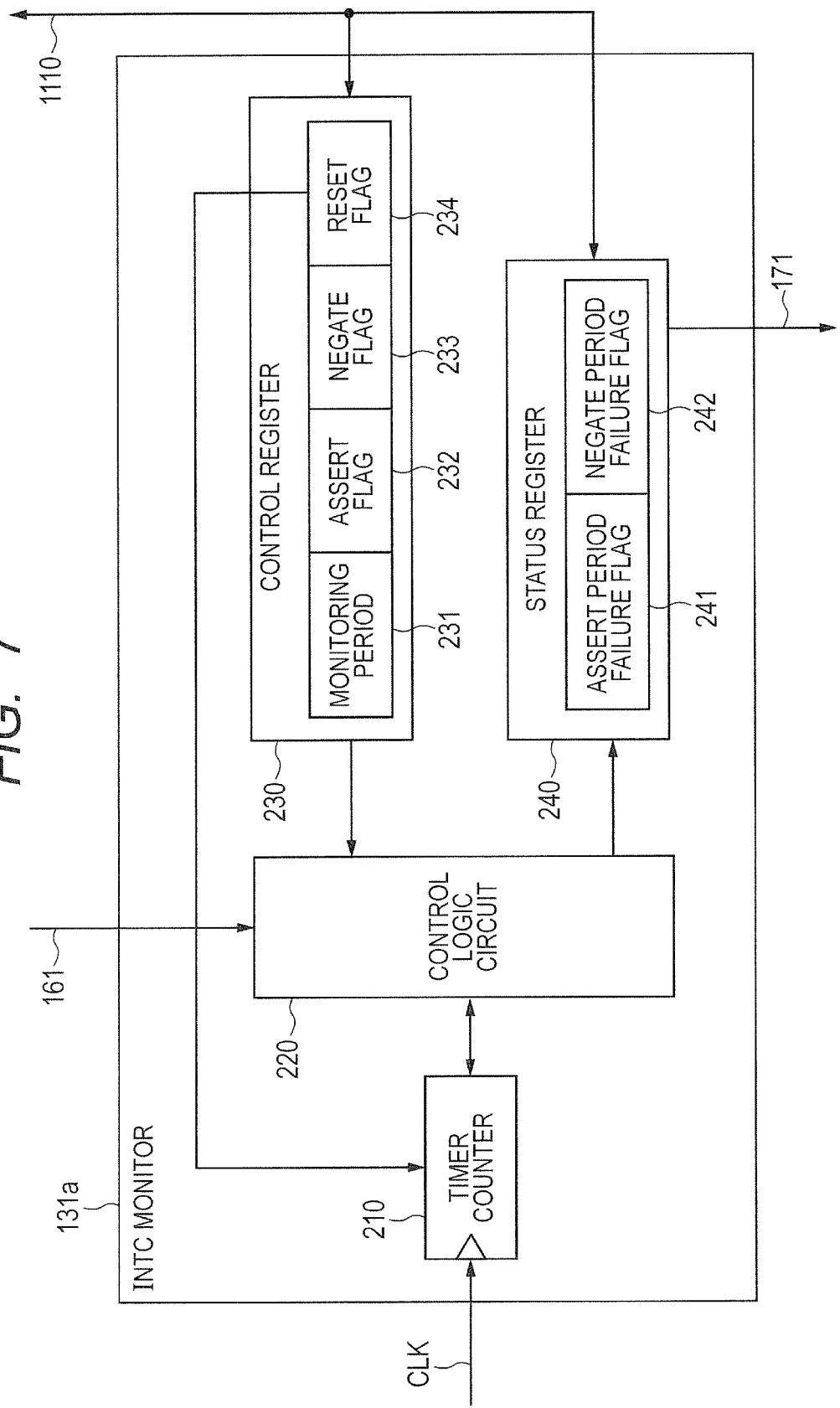
FIG. 7 is a block diagram showing the configuration of an INTC monitor according to a second embodiment.

FIG. 7 is a block diagram showing the configuration of an INTC monitor 131a according to the second embodiment. Unlike in FIG. 2, the INTC monitor 131a further includes a reset flag 234 in a control register 230. For example, a processor 111 or the like sets the reset flag 234 of the control register 230 at 1 through a processor IC signal 1110 at a desired time. When 1 is set in the reset flag 234, the INTC monitor 131a clears the measured value of a timer counter 210.

For example, if multiple interruptions simultaneously occur but one interrupt signal has lower priority than the other in the interrupts, a delay longer than an initially set monitoring period is necessary. In this case, the delay of the interrupt signal is not a failure but may be detected as a failure in an actual operation. In this case, the reset flag is set for the INTC monitor that monitors the interrupt signal, so that the timer counter 210 is temporarily cleared and the count is restarted. Thus, the detection of a failure from the interrupt signal can be held.

Third Embodiment

A third embodiment is a modification of the first or second embodiment. In the third embodiment, the monitoring period of an INTC monitor can be separately set for assertion and negation. In the third embodiment, configurations other than the INTC monitor are identical to those of the first embodiment and thus the illustration and explanation thereof are omitted. The third embodiment may be applied to the second embodiment.

Figure 8:
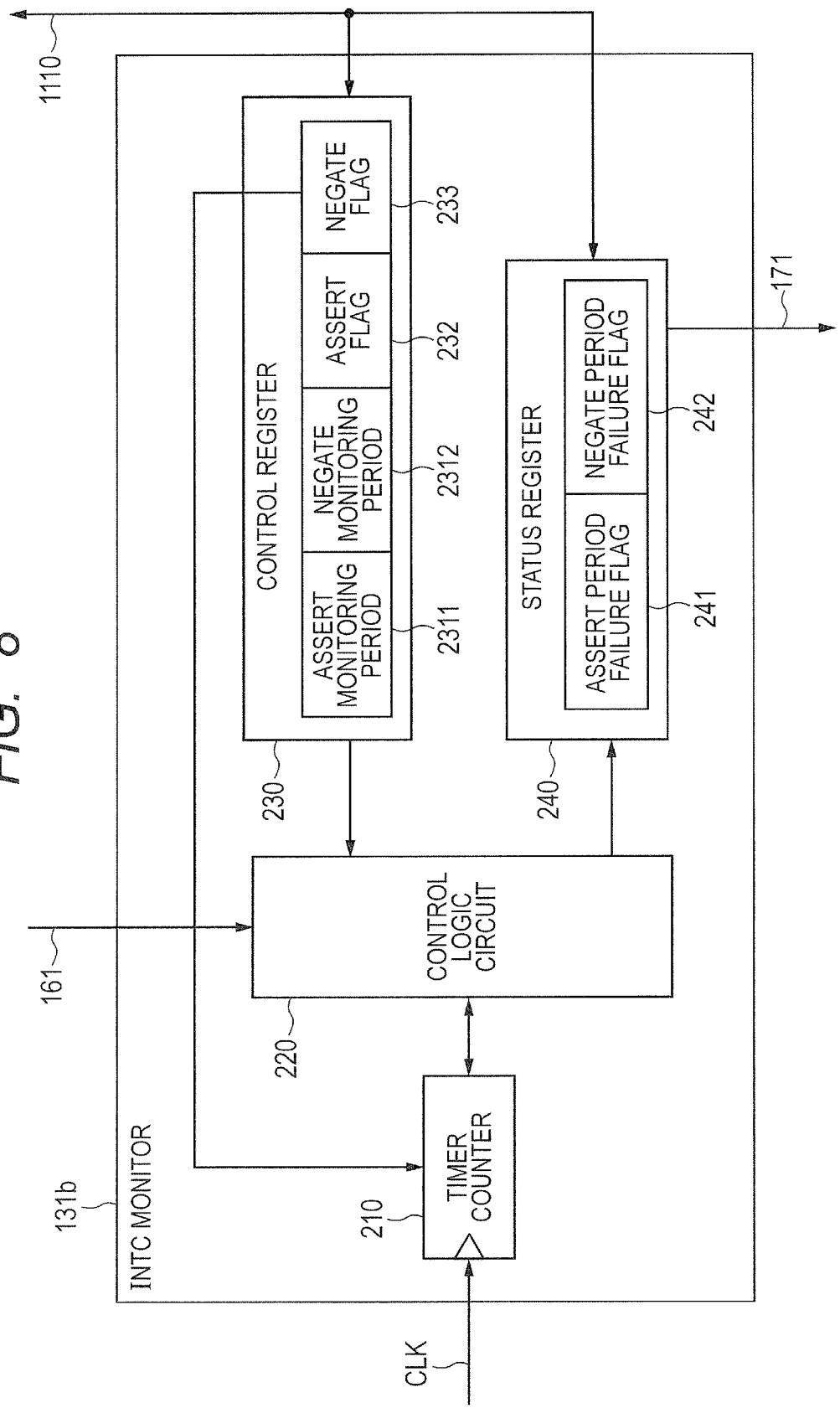
FIG. 8 is a block diagram showing the configuration of an INTC monitor according to a third embodiment.

FIG. 8 is a block diagram showing the configuration of an INTC monitor 131b according to the third embodiment. Unlike in FIG. 2, the INTC monitor 131b is configured such that a monitoring period 231 in a control register 230 is divided into an assert monitoring period 2311 and a negate monitoring period 2312. The assert monitoring period 2311 is an example of a first monitoring period and the negate monitoring period 2312 is an example of a second monitoring period. The assert monitoring period 2311 may be the same period as the negate monitoring period 2312 or a different period from the negate monitoring period 2312.

Figure 9:
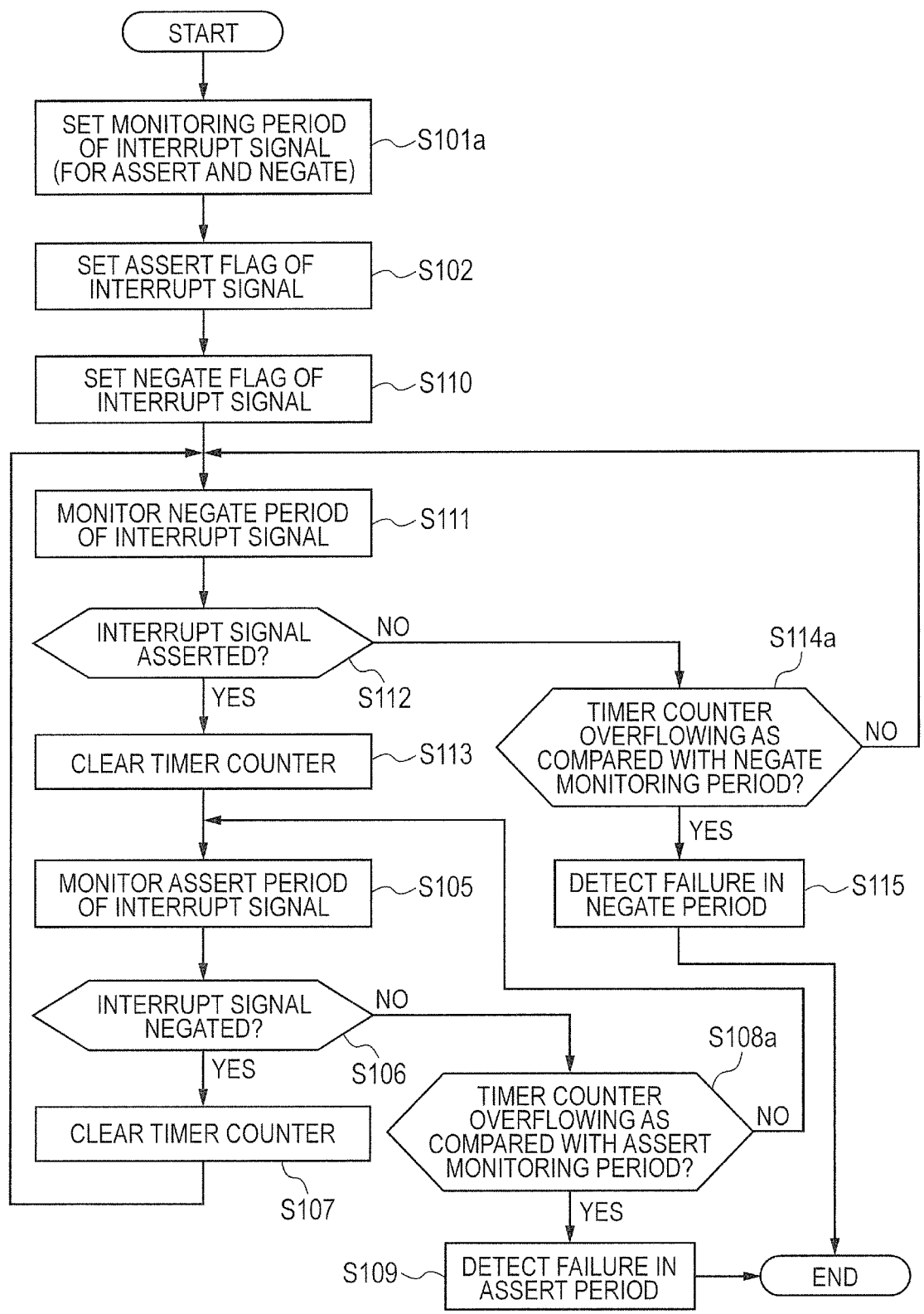
FIG. 9 is a flowchart showing the flow of monitoring the assert period and the negate period of an interrupt signal according to the third embodiment.
Figure 10:
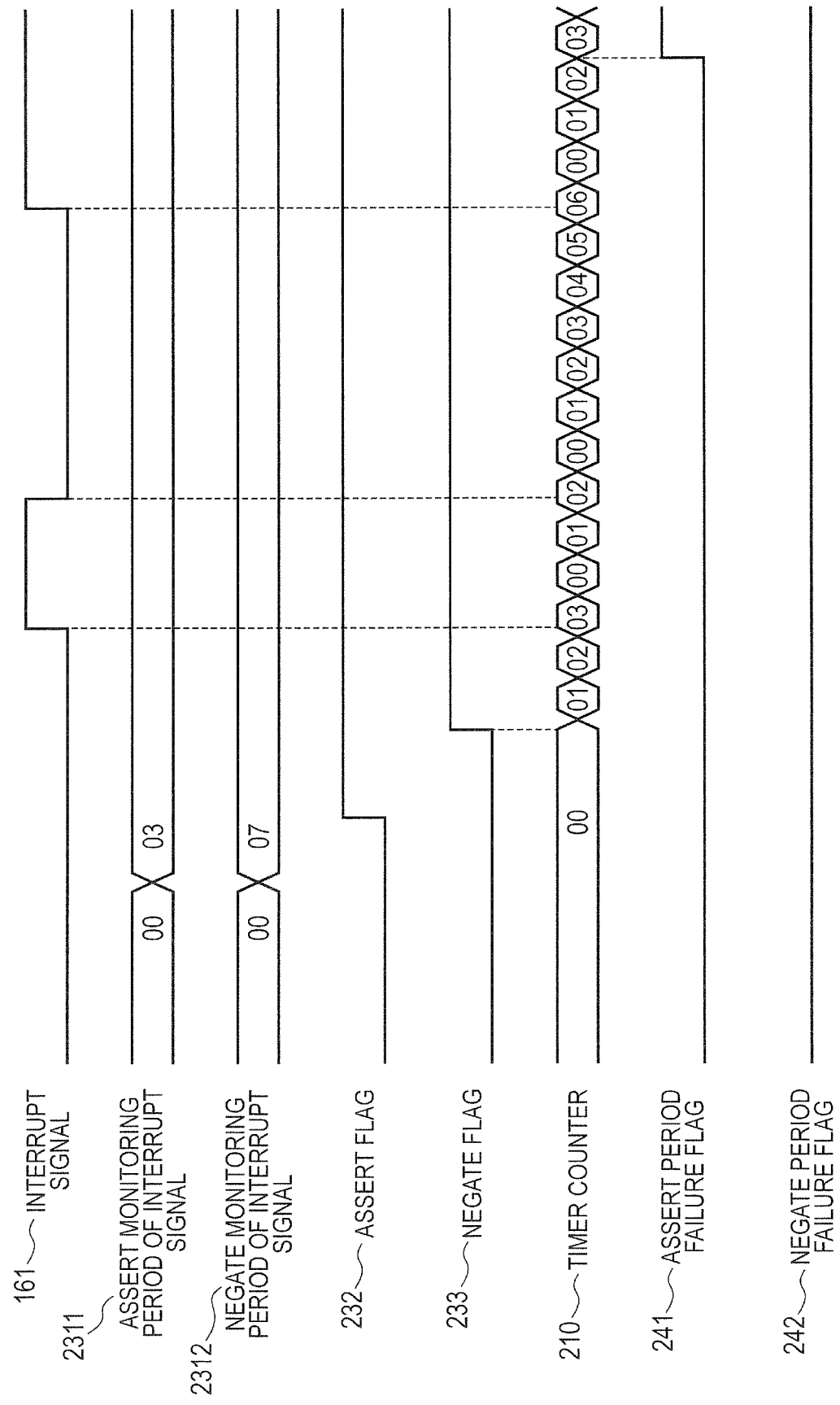
FIG. 10 is a timing chart when the assert period and the negate period of the interrupt signal are monitored according to the third embodiment.

FIG. 9 is a flowchart showing the flow of monitoring the assert period and the negate period of an interrupt signal according to the third embodiment. Moreover, in the following description, an interrupt signal 161 at the start is negated as shown in FIG. 10, which will be discussed later. The explanation of the same processing as in FIG. 5 is omitted.

First, in step S101a, a processor 111 or the like separately sets the assert and negate monitoring periods of the interrupt signal 161. Specifically, the processor 111 or the like sets the assert monitoring period 2311 and the negate monitoring period 2312 in the control register 230 of the INTC monitor 131b.

Then, in step S112, if a control logic circuit 220 does not detect the start of assertion of the interrupt signal 161, the control logic circuit 220 decides whether a timer counter 210 has overflown or not as compared with the negate monitoring period 2312 (S114a). Specifically, the control logic circuit 220 compares a second duration and the negate monitoring period 2312. If it is decided that the second duration exceeds the negate monitoring period 2312, the control logic circuit 220 detects a failure in the negate period (S115). In step S114a, if it is decided that the timer counter 210 has not overflown, the process returns to step S111.

In step S106, if the control logic circuit 220 does not detect the start of negation of the interrupt signal 161, the control logic circuit 220 decides whether the timer counter 210 has overflown or not as compared with the assert monitoring period 2311 (S108a). Specifically, the control logic circuit 220 compares a first duration and the assert monitoring period 2311. If it is decided that the first duration exceeds the assert monitoring period 2311, the control logic circuit 220 detects a failure in the assert period (S109). In step S108a, if it is decided that the timer counter 210 has not overflown, the process returns to step S105.

FIG. 10 is a timing chart showing the monitoring of the assert period and the negate period of the interrupt signal according to the third embodiment. In FIG. 10, 3 msec is set as the assert monitoring period 2311, 7 msec is set as the negate monitoring period 2312, the assert flag 232 is set, and then the negate flag 233 is set. Even if the negate period is 6 msec, the negate period is shorter than the negate monitoring period 2312, so that a failure is not detected. The assert period is 3 msec, which is longer than the assert monitoring period 2311, and thus 1 is set in the assert period failure flag 241. Hereinafter, failure detection is notified through the error control unit 150.

Thus, the present embodiment can be also expressed as follows: The processor or the like sets a monitoring type and the first and second monitoring periods in a setting circuit. The interrupt monitoring circuit starts monitoring the interrupt signal according to the setting of the monitoring type. If the monitoring type indicates the asserted state of the interrupt signal, the interrupt monitoring circuit monitors the asserted state and compares the first duration of the continuous asserted state and the first monitoring period. If the first duration exceeds the first monitoring period, the interrupt monitoring circuit detects the state as a failure. If the monitoring type indicates the negated state of the interrupt signal, the interrupt monitoring circuit monitors the negated state. If the second duration of the continuous negated state exceeds the second monitoring period, the interrupt monitoring circuit detects the state as a failure. In this way, the monitoring periods are respectively set for the assert period and the negate period of the interrupt signal. This can flexibly set the monitoring periods according to the type of interrupt signal, thereby properly detecting a failure.

Fourth Embodiment

A fourth embodiment is a modification of the first to third embodiments. In the first to third embodiments, it is assumed that a frequency divider (not shown) is coupled to a plurality of INTC monitors. Thus, a common period is used for the clock signals. However, some interrupt signals need long monitoring periods, whereas other interrupt signals only need relatively short monitoring periods. Thus, the common period may restrict the monitoring periods. In the fourth embodiment, the periods of clock signals vary among INTC monitors.

Specifically, a semiconductor device according to the fourth embodiment includes at least two interrupt monitoring circuits respectively provided for at least two of multiple interrupt signals, and a plurality of frequency dividers that divides a frequency at different division ratios with respect to an operation clock. The at least two interrupt monitoring circuits operate on operation clocks supplied from at least some of the frequency dividers. This can vary the operation clocks among the interrupt monitoring circuits, thereby flexibly adjusting monitoring periods. The semiconductor device according to the fourth embodiment desirably further includes a selection circuit that selects, from the at least two interrupt monitoring circuits, the destinations of the operation clocks supplied from the frequency dividers. Thus, the monitoring periods can be finely adjusted by a combination of the monitoring periods and the division ratios.

Figure 11:
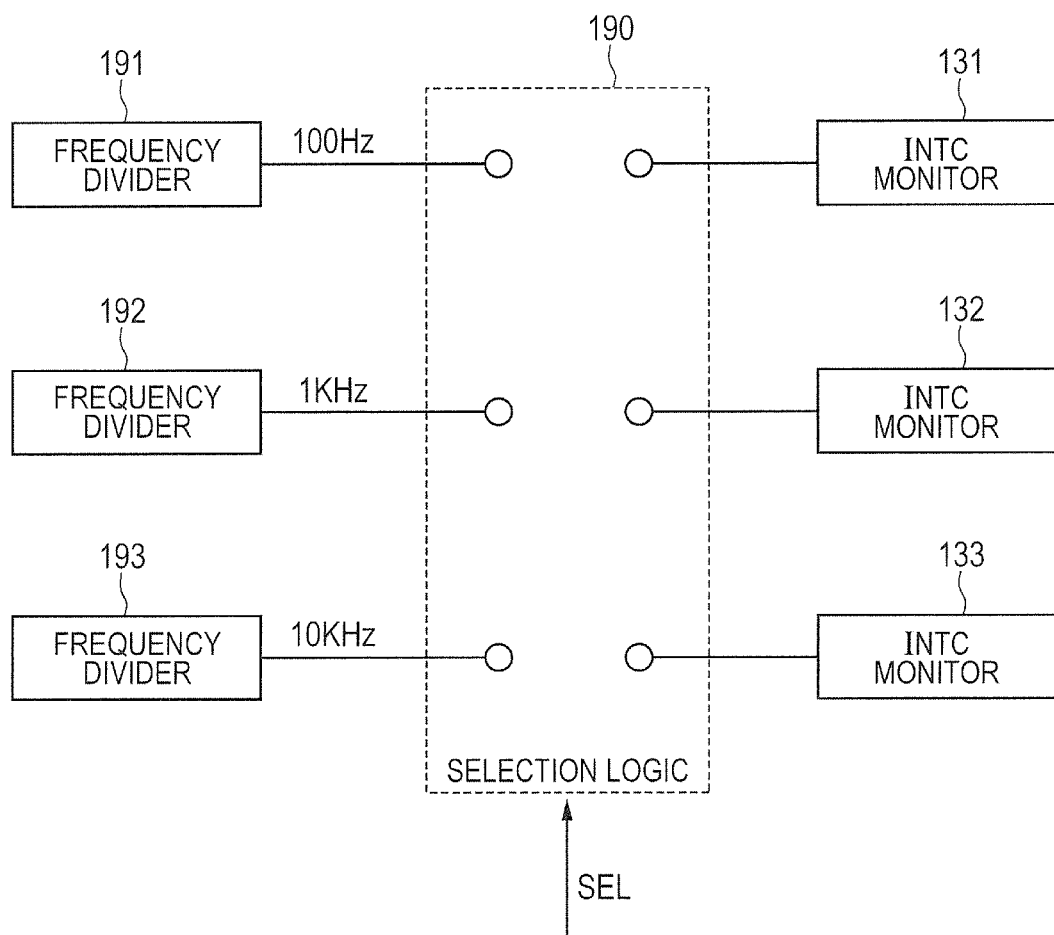
FIG. 11 is a block diagram showing the configuration of INTC monitors and frequency dividers according to a fourth embodiment.

FIG. 11 is a block diagram showing the configuration of the INTC monitors and the frequency dividers according to the fourth embodiment. In this configuration, three interrupt monitoring circuits are used for INTC monitors 131 to 133. For example, the division ratios are set such that a frequency divider 191 outputs a clock signal at 100 Hz, a frequency divider 192 outputs a clock signal at 1 Khz, and a frequency divider 193 outputs a clock signal at 10 KHz. At least two interrupt monitoring circuits are necessary in this configuration. Moreover, at least two frequency dividers are necessary in this configuration. Furthermore, the division ratios are not limited in this configuration. A selection logic 190 is an example of a selection circuit capable of optionally selecting combinations of coupling between the frequency dividers 191 to 193 and the INTC monitors 131 to 133 based on a signal SEL about combinations of the frequency dividers and the INTC monitors. Thus, for example, the processor 111 or the like selects combinations of the frequency dividers and the INTC monitors through the selection logic 190 in response to the signal SEL, thereby coupling the frequency dividers and the INTC monitors in any combinations. Hence, the monitoring periods can be more finely adjusted by setting the division ratios of the frequency dividers, setting the monitoring periods of the INTC monitors, and specifying combinations in the selection logic 190.

Fifth Embodiment

A fifth embodiment is a modification of the first to fourth embodiments.

Means for detecting a failure to secure functional safety include, for example, a scan test for selecting defective chips during manufacturing and a power-on self test (POST) conducted at startup after a semiconductor device is assembled into a user system. The POST, in particular, is always conducted before the semiconductor device is actually used. If a large circuit is to be inspected in the semiconductor device and thus a test time is expected to increase, some measures may be conducted to shorten the test time. For example, a POST may be conducted on circuit blocks (hierarchy) that are groups of circuits classified by functions. However, the POST cannot be conducted for signals that cross the hierarchies. This may disadvantageously reduce a failure detection rate regarding the signals that cross the hierarchies.

Thus, according to the first embodiment, a failure can be detected on a part that is undetectable by the POST during an operation of the semiconductor device. Specifically, the INTC monitor according to the first embodiment monitors the interrupt signal from the peripheral IP to the INTC. If the peripheral IP and the INTC are provided in different hierarchies, the interrupt signal may be a signal that crosses the hierarchies. Thus, the monitoring of the interrupt signal by the INTC monitor may detect a failure undetectable by the POST.

Furthermore, in view of functional safety, whether or not the interrupt signal is properly monitored and set needs to be checked for each predetermined period during an operation of the semiconductor device. At this point, the values of the assert flag and the negate flag of the control register in the INTC monitor are read and the read values are compared with a predetermined expected value, thereby examining whether the interrupt signal is properly monitored and set.

A recent semiconductor device includes, for example, several hundreds interrupt signals. The INTC monitor and the control register according to the first embodiment are provided for each interrupt signal, so that the reading of the values of the assert flag and the negate flag requires quite a long processing time. However, as described above, the values of the flags need to be read in a predetermined period and a large number of set values need to be examined for functional safety circuits other than the INTC monitors. Hence, a short processing time is more desirable.

Thus, in the fifth embodiment, addresses are defined so as to collectively refer to the values of an assert flag and a negate flag in a control register provided for each interrupt signal. Specifically, for the assert flag and the negate flag, consecutive reference addresses are assigned between the control registers. For example, a reference address 1 is assigned to the assert flag of the first control register, a reference address 2 subsequent to the reference address 1 is assigned to the negate flag of the first control register, a reference address 3 subsequent to the reference address 2 is assigned to the assert flag of the second control register, and a reference address 4 subsequent to the reference address 3 is assigned to the negate flag of the second control register. As an access request from the processor or the like to an interrupt monitoring unit, the reference address 1 indicates a start address and the reference address 4 indicates a size. In this case, the values of the reference addresses 1 to 4 are read in response to the access request. In other words, only a single access request enables reading of the assert flags and negate flags of the first and second control registers. The reference addresses are assigned to handle a virtual register obtained only by the assert flag and the negate flag from at least two of the control registers, from the processor or the like outside the interrupt monitoring unit. For example, the virtual register can be achieved by assigning consecutive reference addresses that are set in the semiconductor device so as to collectively refer to INTC monitors regarding a flip-flop that holds an assert flag and a negate flag among flip-flops constituting the control register. In this case, the number of virtual registers is smaller than the number of control registers. Thus, during the setting of the assert flag and the negate flag, the processor or the like makes a setting request separately to the first address for access to the corresponding control register. When the setting of the assert flag and the negate flag is confirmed, the processor or the like makes a reference request to the second address (reference address) for access to the virtual register. As described above, the number of virtual registers is smaller than the total number of control registers (the number of interrupt signals to be monitored), thereby shortening the reading time of all the values of the assert flag and the negate flag.

Figure 12:
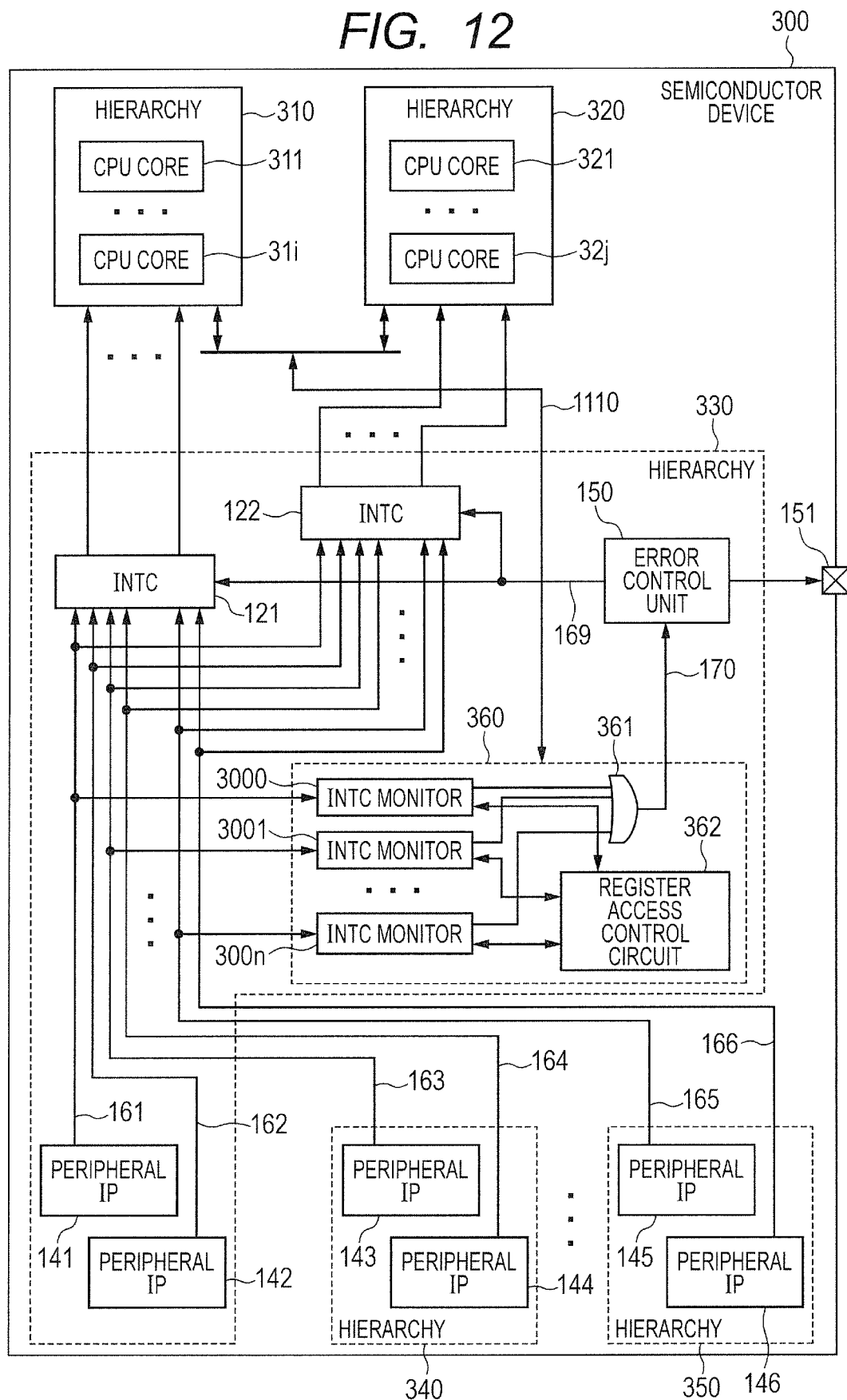
FIG. 12 is a block diagram showing the configuration of a semiconductor device according to a fifth embodiment.

FIG. 12 is a block diagram showing the configuration of a semiconductor device 300 according to the fifth embodiment. The semiconductor device 300 includes a hierarchy 310, a hierarchy 320, a hierarchy 330, a hierarchy 340, and a hierarchy 350. The hierarchy 310 is a circuit block (Hereinafter will be referred to as "circuit hierarchy") including a plurality of CPU cores 311 to 31*i* (i is an integer not smaller than 2). The hierarchy 320 is a circuit hierarchy including a plurality of CPU cores 321 to 32*j* (j is an integer not smaller than 2). The hierarchy 330 is a circuit hierarchy including INTCs 121 and 122, an interrupt monitoring unit 360, peripheral IPs 141 and 142, and an error control unit 150. The hierarchy 340 is a circuit hierarchy including peripheral IPs 143 and 144. The hierarchy 350 is a circuit hierarchy including peripheral IPs 145 and 146. The number of hierarchies 310 and 320 including the CPU cores may be three or more. The number and kinds of peripheral IPs included in the hierarchies 330, 340, and 350 are not limited. Furthermore, a circuit hierarchy including peripheral IPs may be provided in addition to the hierarchies 340 and 350.

In this configuration, interrupt signals 161, 163, and 165 are set as targets of interrupt in the INTC 121. In the INTC 122, interrupt signals 162, 164, 166, and 169 are set as targets of interrupt.

The interrupt monitoring unit 360 includes INTC monitors 3000, 3001, . . . , and 300*n* (n is an integer not smaller than 2), an OR circuit 361, and a register access control circuit 362. The INTC monitor 3000 corresponds to the interrupt signal 161, the INTC monitor 3001 corresponds to the interrupt signal 163, and the INTC monitor 300*n* corresponds to the interrupt signal 165. The OR circuit 361 outputs the result of the logical sum of failure notification signals from the INTC monitors 3000 to 300*n*, as a failure notification signal 170.

In the semiconductor device 300, a first address is defined for access to the control registers provided in the INTC monitors 3000 to 300*n*. In other words, the first address is an address suitable for access to each of the control registers. Furthermore, in the semiconductor device 300, a second address is defined to access the assert flag and the negate flag, which indicate monitoring types, in the control register. The second address is a reference address that is defined to read the assert flag and the negate flag, which are separately stored for each of the interrupt signals, at consecutive addresses.

The register access control circuit 362 controls access for reading or writing at a specified address in response to an access request from, for example, the CPU cores in the hierarchy 310 or 320. The register access control circuit 362 can be achieved by, for example, a decoder that converts an accessed address into a physical address. For example, the CPU core specifies the first address for the register access control circuit 362 and transmits a writing request for setting the values of the assert flag and the negate flag. In this case, the register access control circuit 362 sets the values specified by the writing request, in the storage areas of the assert flag and the negate flag of the control register specified by the first address. Moreover, the CPU core specifies the second address and a read size for the register access control circuit 362 and transmits a reading request for the assert flag and the negate flag. In this case, the register access control circuit 362 reads data up to an address at the read size from the assert flag of the control register specified by the second address. At this point, at the second address, consecutive addresses are assigned to the storage areas of the assert flag and the negate flag among the control registers, thereby reading only the assert flag and the negate flag in response to the reading request.

Figure 13:
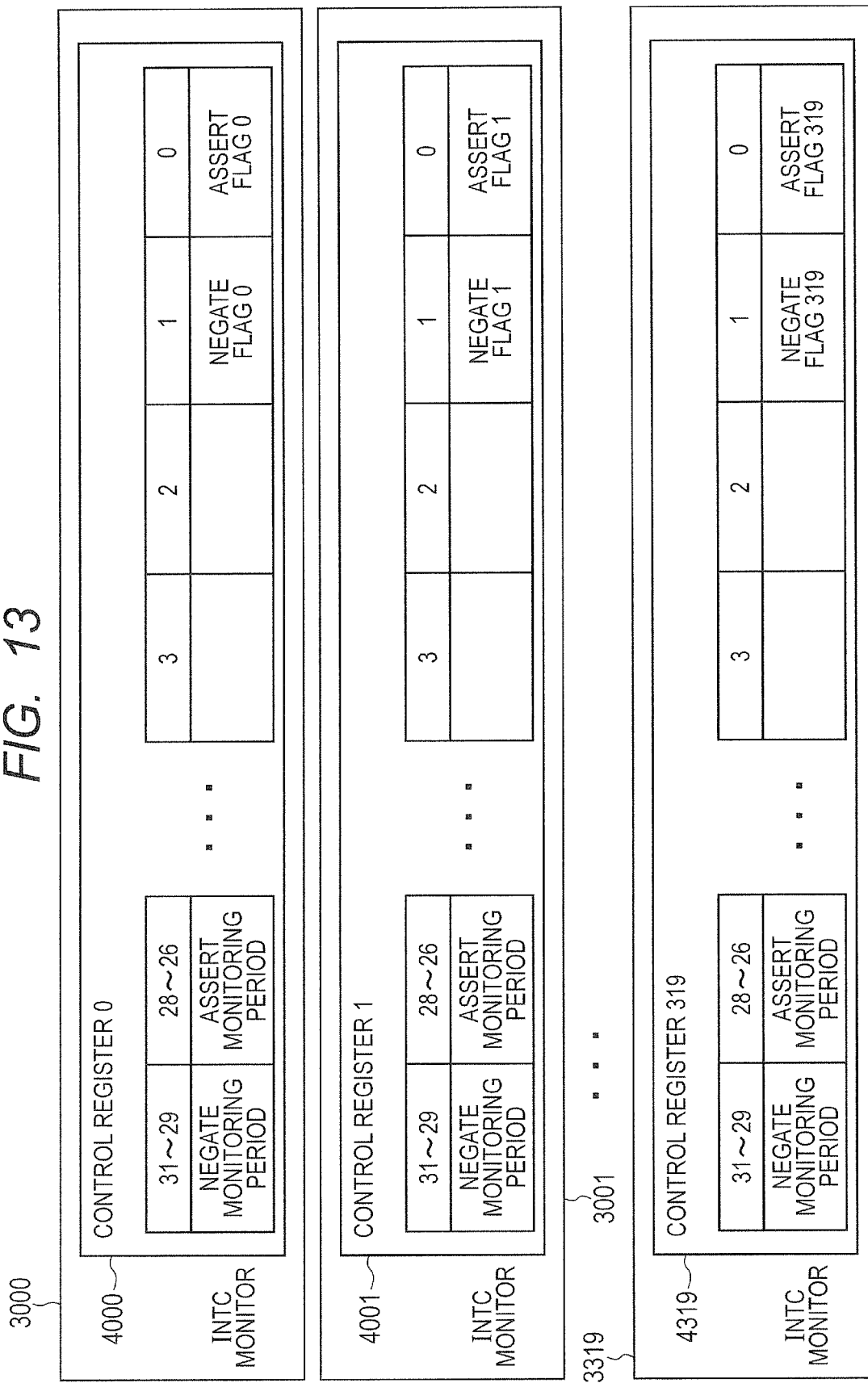
FIG. 13 shows an example of a control register according to the fifth embodiment.

FIG. 13 shows an example of the control register according to the fifth embodiment. In this configuration, 320 interrupt signals are to be monitored, the assert flag is set at 1 bit, the negate flag is set at 1 bit, and 32 bits of the register can be read at a time from the processor 111 or the like. Thus, the 320 INTC monitors 3000 to 3319 are provided and the 320 control registers 0_4000 to 319_4319 are provided. In each of the control registers, the assert flag and the negate flag are each set at 1 bit. The storage positions and storage sizes of the assert flag, the negate flag, an assert monitoring period, and a negate monitoring period are not limited to the example of FIG. 13. FIG. 13 shows the concepts of the registers recognized from a processor 111 or the like in access at the first address. Specifically, for example, the consecutive first address is assigned to the flip-flops of 32 bits from the assert flag 0 to the negate monitoring period of the control register 0_4000. Thereafter, the consecutive first address is also assigned to the flip-flops of 32 bits from the assert flag 1 to the negate monitoring period of the control register 1_4001 and from the assert flag 319 to the negate monitoring period of the control register 319_4319. Consecutive addresses are not necessary between the control registers.

Thus, in order to specify the first address from the processor 111 so as to read the assert flag and the negate flag in each of the control registers, reading needs to be performed 320 times. Hence, for confirmation of the monitoring setting of the interrupt signal, reading needs to be performed 320 times. In the present embodiment, reading is performed on a virtual register as will be discussed below.

Figure 14:
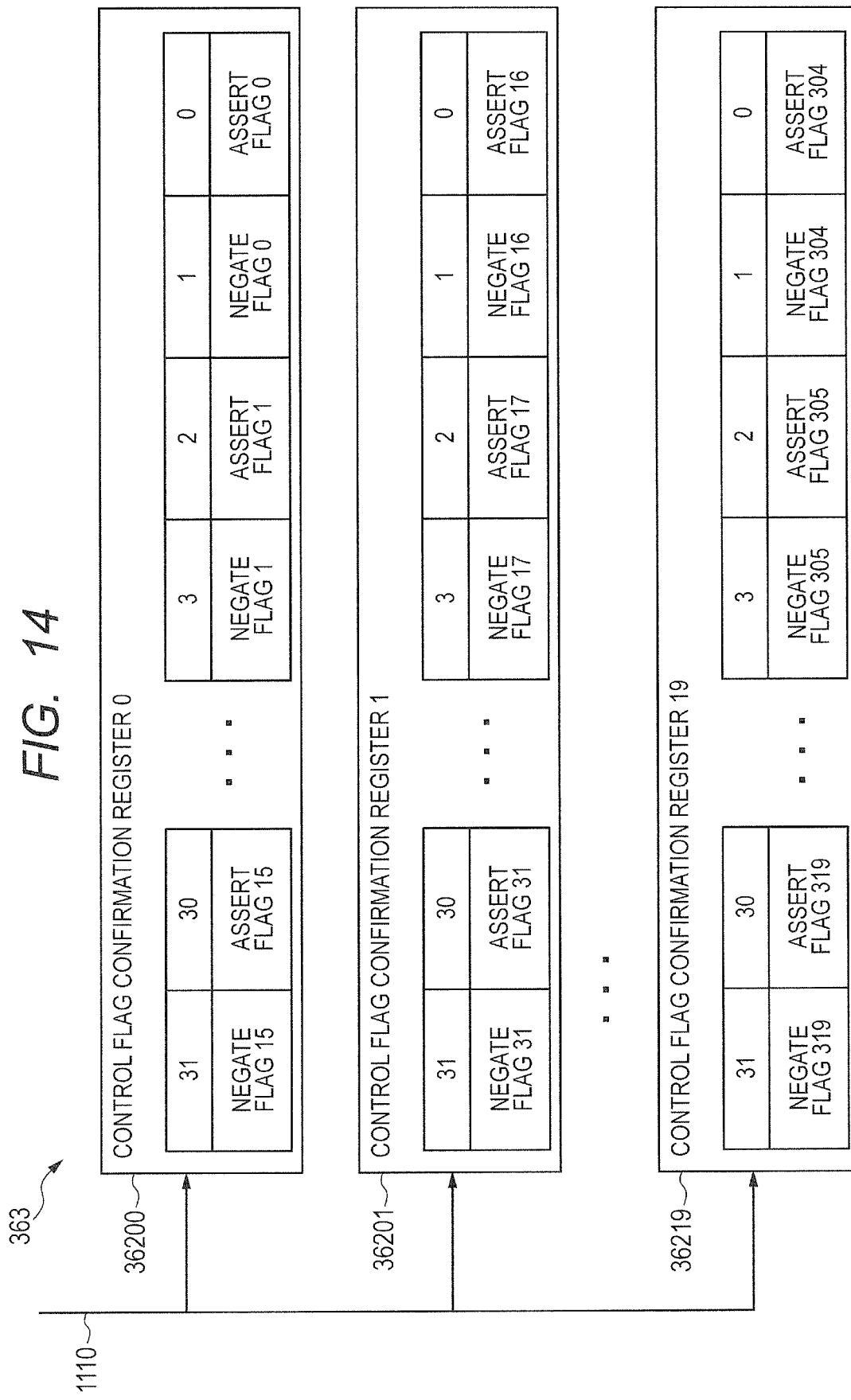
FIG. 14 shows an example of a control flag confirmation register according to the fifth embodiment.

FIG. 14 shows an example of a virtual register 363 according to the fifth embodiment. FIG. 14 shows the concepts of the registers recognized from the processor 111 or the like in access at the second address. In the example of FIG. 14, the virtual register 363 can be expressed by 20 control flag confirmation registers 0_36200 to 19_36219. In the control flag confirmation register 0_36200, reference to the flip-flops of the assert flag 0 and the negate flag 0 of the control register 0_4000 is set. Similarly, reference to the flip-flops is set for the assert flag 1 and the negate flag 1 of the control register 1_4001, . . . , and the assert flag 15 and the negate flag 15 of the control register 15_4015. In other words, it can be assumed that the control flag confirmation register 0_36200 collectively holds the set values of the assert flag and the negate flag among the control registers 0_4000 to 15_4015. Thus, for example, access to the control flag confirmation register 0_36200 is access to the assert flag and the negate flag among the control registers 0_4000 to 15_4015. Moreover, for example, the consecutive second address is assigned to the flip-flops of 32 bits from the assert flag 0 to the negate flag 15 of the control flag confirmation register 0_36200. Thereafter, the consecutive second address is also assigned to the flip-flops of 32 bits from the assert flag 16 to the negate flag 31 of the control flag confirmation register 1_36201 and from the assert flag 304 to the negate flag 319 of the control flag confirmation register 19_36219. Consecutive addresses are not necessary between the control registers.

Thus, the second address is specified from the processor 111 so as to read the assert flag and the negate flag in each of the control flag confirmation registers, thereby suppressing the number of times of reading to 20. Hence, reading on the control flag confirmation registers can be performed in a shorter time than reading on the control registers.

According to the above explanation, the present embodiment can be also expressed as follows: the semiconductor device includes at least two interrupt monitoring circuits respectively provided for at least two of the interrupt signals. For the semiconductor device, the reference address for collectively referring to monitoring types set for the respective setting circuits provided in the at least two interrupt monitoring circuits. Moreover, the semiconductor device further includes the access control circuit (register access control circuit 362) that reads the monitoring types from the setting circuits in response to an access request for the reference address and collectively sends the read monitoring types to the source of the access request. Thus, without separately referring to the control registers provided for the respective interrupt signals, access is made using the reference address that can collectively access the flags through the access control circuit, thereby shortening the confirmation time of monitoring settings.

Another aspect of the present embodiment will be discussed below. First, a method of detecting a failure will be discussed for the semiconductor device 300 including the circuit hierarchies 310 to 350, each having a plurality of circuits. The circuits include the processors (CPU cores 311 to 31i and 321 to 32i), the circuit blocks (peripheral IPs 141 to 146), the interrupt control circuit (INTC 121), and the at least one interrupt monitoring circuit (INTC monitor 3000). In this configuration, the processors perform a predetermined interrupt in response to an interrupt request. The circuit blocks output the interrupt signals 161 to 166, respectively. The interrupt control circuit receives multiple interrupt signals from the circuit blocks and outputs an interrupt request 181 to one of the processors. The interrupt monitoring circuits are provided for the respective interrupt signals 161, 163, and 165 and each include the setting circuit for setting a monitoring type, which indicates the monitoring state of the corresponding interrupt signal, and the first and second monitoring periods. With this configuration, a predetermined operation check test is performed on each of the circuit hierarchies at the startup of the semiconductor device 300. In the absence of abnormality in the operation check test, the semiconductor device is normally activated. In a normal operation, the interrupt signal from the second circuit hierarchy to the first circuit hierarchy is monitored by some of the interrupt monitoring circuits. In this configuration, the first circuit hierarchy includes the interrupt control circuit and the interrupt monitoring circuits. The second circuit hierarchy is a circuit hierarchy other than the first circuit hierarchy. If the monitoring type indicates the asserted state of the interrupt signal in the interrupt monitoring circuit and a first duration of the continuous asserted state exceeds a first monitoring period, the interrupt monitoring circuit detects the state as a failure. If the monitoring type indicates the negated state of the interrupt signal and a second duration of the continuous negated state exceeds a second monitoring period, the interrupt monitoring circuit detects the state as a failure. The signal that crosses the hierarchies is monitored so as to detect a failure undetectable in an operation check test conducted upon startup in the same hierarchy, thereby improving the failure detection rate.

During a normal operation, some of the processors can read a monitoring type from the setting circuit of the interrupt monitoring circuit and compare the monitoring type with a predetermined expected value. Thus, whether or not the interrupt signal is properly monitored can be periodically and quickly checked during an operation of the semiconductor device. Moreover, the INTC monitor provided for functional safety can securely perform the proper monitoring function.

The first circuit hierarchy further includes at least two interrupt monitoring circuits respectively provided for at least two of the interrupt signals. For the semiconductor device 300, the reference address for collectively referring to monitoring types set for the respective setting circuits provided in the at least two interrupt monitoring circuits. During a normal operation of the semiconductor device 300, it is desirable to read the monitoring types from the setting circuits in response to an access request for the reference address from the first processor of the processors and collectively send the read monitoring types to the first processor. Thus, without separately referring to the control registers provided for the respective interrupt signals, access is made using the reference address that can collectively access the flags through the access control circuit, thereby shortening the confirmation time of monitoring settings.

Sixth Embodiment

Figure 15:
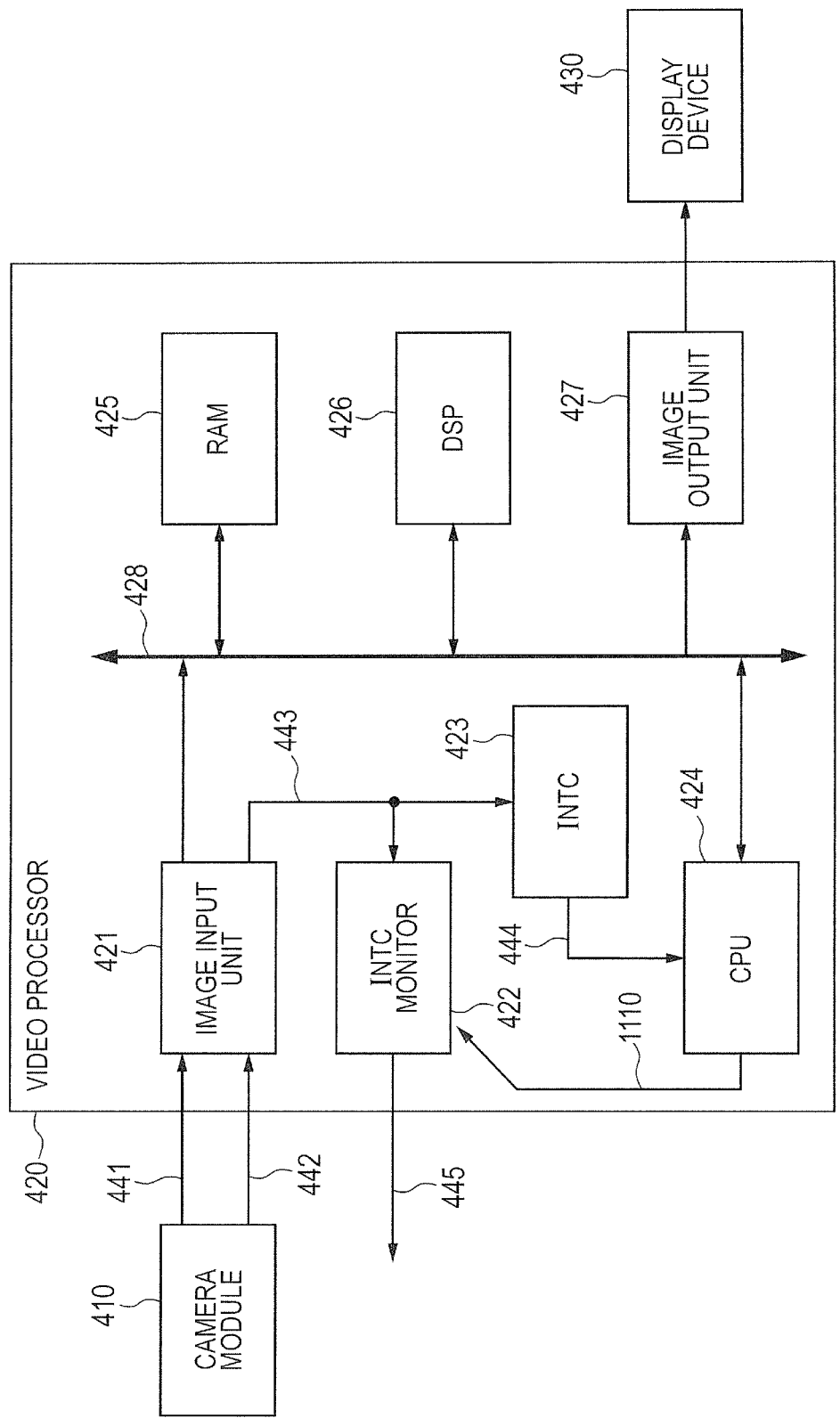
FIG. 15 is a block diagram showing the configuration of a video processing device according to a sixth embodiment.

A sixth embodiment is a modification of the first to fifth embodiments. Specifically, the application of the semiconductor device to a video processing device will be discussed below. FIG. 15 is a block diagram showing the configuration of a video processing device 420 according to the sixth embodiment. The video processing device 420 receives the input of video data from a camera module 410 and outputs display data to a display device 430. The camera module 410 inputs captured video data as images to the video processing device 420. Specifically, when the power is turned on, the camera module 410 starts inputting image data 441. The camera module 410 outputs an interrupt signal 442 to the video processing device 420 each time image data of one frame is inputted.

The video processing device 420 includes an image input unit 421, an INTC monitor 422, an INTC 423, a CPU 424, a RAM 425, a digital signal processor (DSP) 426, an image output unit 427, and a bus 428. The RAM 425 is a storage device for storing image data. The image input unit 421 receives the image data 441 inputted from the camera module 410 and stores the image data in the RAM 425 through the bus 428. When detecting the start of video input (image data input of one frame) from the camera module 410, the image input unit 421 outputs, to the INTC monitor 422 and the INTC 423, an interrupt signal 443 indicating the start of video input to the CPU 424. In response to the interrupt signal 443 indicating the start of video input, the INTC 423 outputs, to the CPU 424, an interrupt request 444 indicating the start of video input. In response to the interrupt request 444 indicating the start of video input, the CPU 424 sets a monitoring type on the INTC monitor 422 through a processor IC signal 1110. The monitoring type may be set by the image input unit 421. The monitoring type is not always set at the input of the image data of one frame. The monitoring type may be set when the camera module 410 is powered on. The image input unit 421 may be the peripheral IP. Specifically, when detecting the interrupt signal 442 from the camera module 410, the image input unit 421 outputs the interrupt signal 443 to the INTC monitor 422 and the INTC 423.

The INTC 423 outputs the interrupt request 444 to the CPU 424 in response to the interrupt signal 443. In response to the interrupt request 444, the CPU 424 performs a computation according to a predetermined program. Specifically, the CPU 424 reads image data of one frame from the RAM 425 through the bus 428 and notifies the data to the DSP 426. The DSP 426 performs, for example, compression on the notified image data according to a predetermined algorithm. The compressed data may be stored in the RAM 425. The image output unit 427 outputs the compressed data as display data to the display device 430 and displays the data on a screen.

In the INTC monitor 422, a period is set as a monitoring period (negate monitoring period 2312) according to the processing of one frame of a video image. The INTC monitor 422 monitors the interrupt signal 443. If a negate period exceeds the negate monitoring period 2312, the INTC monitor 422 detects the state as a failure and outputs a failure notification signal 445. In this case, even after a lapse of a processing time equivalent to one frame, the interrupt signal 443 is not asserted and thus a failure may be present in, for example, the camera module 410.

Also when an assert period exceeds a predetermined assert monitoring period 2311, the INTC monitor 422 detects the state as a failure and outputs a failure notification signal 445. In this case, after the interrupt signal 443 is asserted once, some processing is not completed on image data of one frame and the interrupt signal 443 is not negated. Thus, a failure may be present in, for example, the INTC 423 or the CPU 424.

Hence, in the setting circuit according to the sixth embodiment, the monitoring type is set at the start of video input from the camera module and a period is set as the monitoring period according to the processing of one frame of the video image. Thus, a failure can be properly detected in image processing.

More specifically, the interrupt monitoring circuit corresponds to the interrupt signal outputted for each frame of a captured image from the camera module through one of the circuit blocks, the monitoring type in the setting circuit provided in the interrupt monitoring circuit is set at the start of video input from the camera module, and the monitoring period set in the setting circuit is a period corresponding to the processing of one frame of a captured image.

Seventh Embodiment

A seventh embodiment is a modification of the first to fifth embodiments. Specifically, the semiconductor device is applied to terminals in a communication system where frames are transmitted and received between the terminals through a transmission path. In the following example, the communication system is applied to a time trigger system where frame data is transmitted and received between electronic controllers, which are controllers for onboard equipment or production lines, according to a predetermined time schedule.

Figure 16:
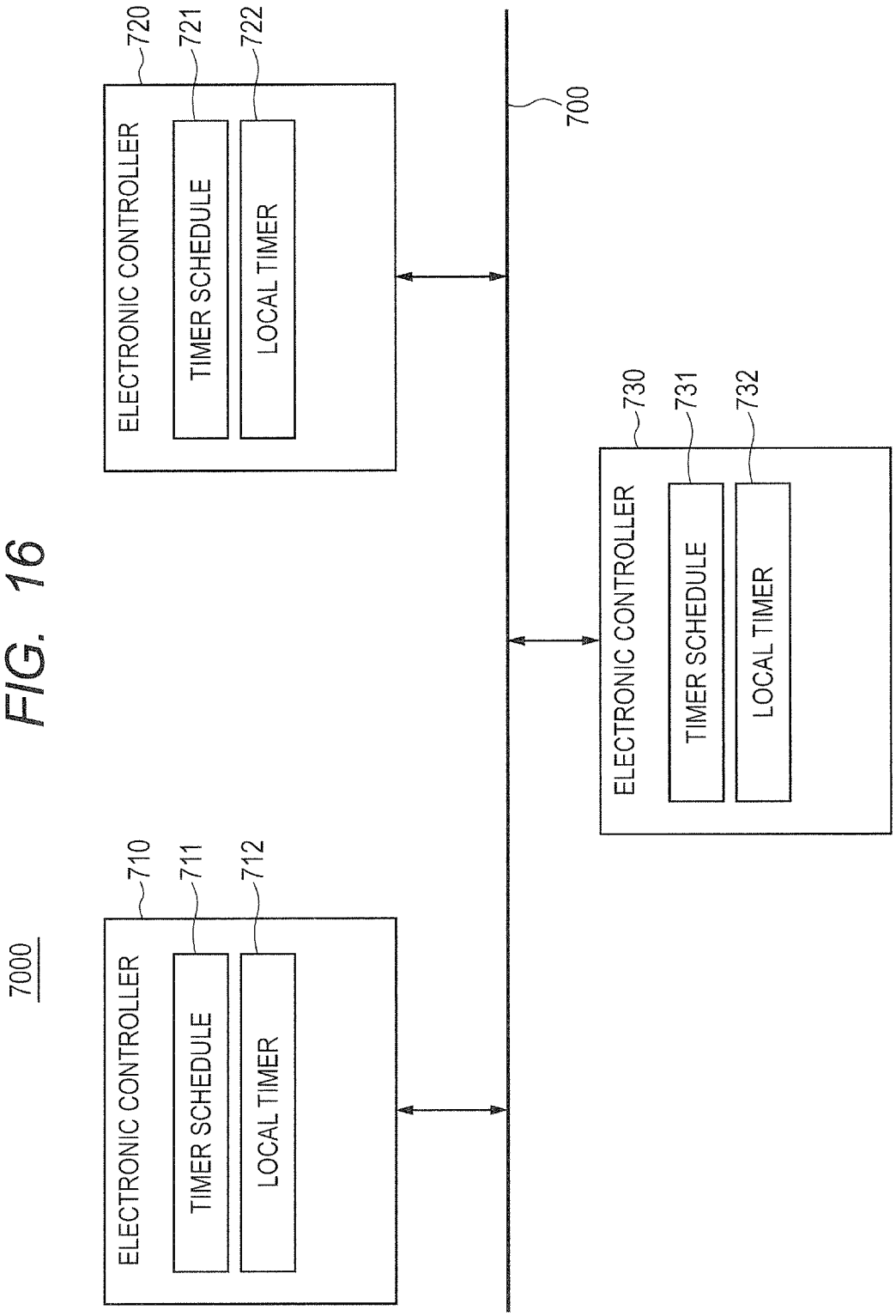
FIG. 16 is a block diagram showing the configuration of a time trigger system according to a seventh embodiment.

FIG. 16 is a block diagram showing the configuration of a time trigger system 7000 according to the seventh embodiment. The time trigger system 7000 includes a plurality of electronic controllers 710, 720, and 730 coupled to a network bus 700. The electronic controller 710 includes a timer schedule 711 and the local timer 712 and has the function of transmitting and receiving frame data (not shown). The electronic controllers 720 and 730 have the same configurations and functions.

In the timer schedules 711, 721, and 731, the timing for transmitting and receiving frame data among the electronic controllers 710 to 730 is defined with a common time axis. The electronic controllers 710 to 730 each decide the processing timing, which is defined in the time schedule, according to the local timer and transmit and receive frame data. For example, the electronic controller 710 decides an arrival at the transmission time of frame data of the electronic controller 710 according to the local timer 712, the transmission time being defined in the timer schedule 711. The electronic controller 710 transmits the frame data at the transmission time. Thus, the local timers 712, 722, and 732 need to be synchronized with one another. The local timers can be synchronized with one another according to the related art.

Figure 17:
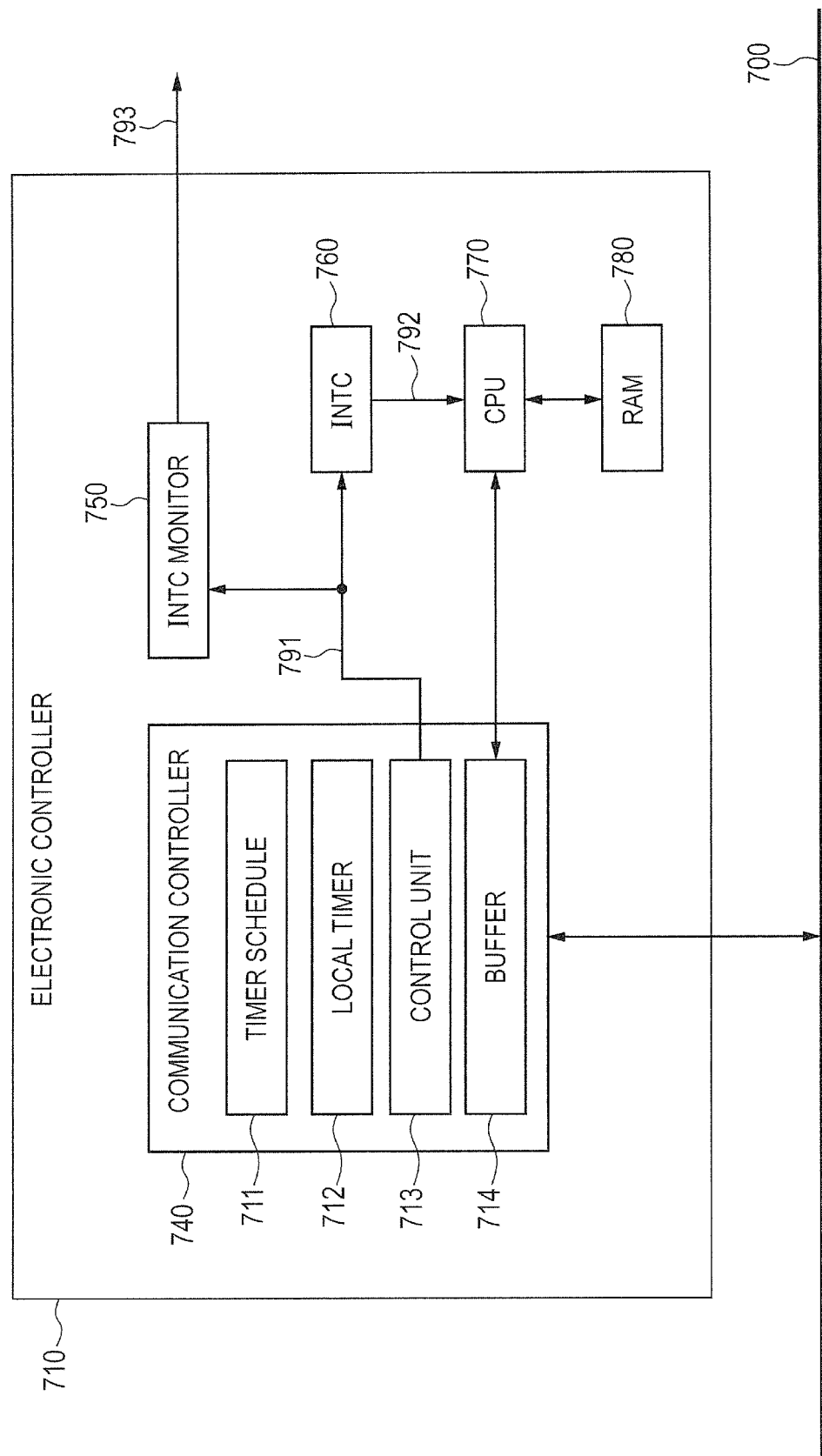
FIG. 17 is a block diagram showing the configuration of an electronic controller in the time trigger system according to the seventh embodiment.

FIG. 17 is a block diagram showing the configuration of the electronic controller 710 provided in the time trigger system 7000 according to the seventh embodiment. The configurations of the electronic controllers 720 and 730 are identical to those of the electronic controller 710 and thus the illustration and explanation thereof are omitted.

The electronic controller 710 includes a communication controller 740, an INTC monitor 750, an INTC 760, a CPU 770, and a RAM 780. The communication controller 740 is an example of a peripheral IP. The communication controller 740 includes the timer schedule 711, the local timer 712, a control unit 713, and a buffer 714. In the timer schedule 711, the timing of transmitting and receiving frame data at least in the electronic controller 710 is defined with the time axis shared with the timer schedules 712 and 731. The local timer 712 is synchronized with the local timers 722 and 732. The control unit 713 controls the processing of the communication controller 740. For example, the control unit 713 performs time synchronization of the local timer 712 and transmits and receives data. In response to the time synchronization of the local timer 712, the control unit 713 sets a monitoring type for the INTC monitor 750. The monitoring type may be set by the CPU 770. Moreover, the control unit 713 sets a time corresponding to the time interval of transmission and reception of the electronic controller 710, as a monitoring period in the INTC monitor 750. The time interval is defined in the timer schedule 711. For example, if the transmission and reception of the electronic controller 710 are defined at equal time intervals in the timer schedule 711, the monitoring period is fixed. If the transmission and reception of the electronic controller 710 are defined at different intervals in the timer schedule 711, the monitoring period of the INTC monitor 750 is updated each time. The control unit 713 decides whether or not a time indicated by the local timer 712 has reached a time defined in the timer schedule 711. If the time of the local timer 712 has reached the time defined in the timer schedule 711, the control unit 713 outputs an interrupt signal 791 to the INTC monitor 750 and the INTC 760. The buffer 714 is a storage area that holds data received from the electronic controllers 720 and 730 through the network bus 700 and holds data to be transmitted to the electronic controllers 720 and 730.

The INTC 760 outputs an interrupt request 792 to the CPU 770 in response to the interrupt signal 791. In response to the interrupt request 792, the CPU 770 performs a computation according to a predetermined program. The CPU 770 reads received data in the buffer 714 and stores the data in the RAM 780. Moreover, the CPU 770 reads transmission data from the RAM 780 and stores the data in the buffer 714. Additionally, the CPU 770 performs processing on transmitted and received data.

In the INTC monitor 750, a period is set as a monitoring period (negate monitoring period 2312) according to the timing of generating the interrupt signal 791 outputted based on the local timer 712. The INTC monitor 750 monitors the interrupt signal 791. If a negate period exceeds a negate monitoring period 2312, the INTC monitor 750 detects the state as a failure and outputs a failure notification signal 793. In this case, if the local timer 712 is normal, the interrupt signal 791 is always asserted in a predetermined monitoring period. Thus, if the interrupt signal 791 is not asserted in the negate monitoring period 2312 and the negate period exceeds the negate monitoring period 2312, a failure may be present in, for example, the local timer 712.

Also when an assert period exceeds a predetermined assert monitoring period 2311, the INTC monitor 750 detects the state as a failure and outputs the failure notification signal 793. In this case, if the INTC 760 and the CPU 770 are normal, the interrupt signal 791 is always negated in the predetermined assert monitoring period 2311. Thus, if the interrupt signal 791 is not asserted in the negate monitoring period 2311 and the assert period exceeds the assert monitoring period 2311, a failure may be present in, for example, the INTC 760 or the CPU 770, a wire may be cut between the INTC 760 and the CPU 770, or a failure over the time trigger system 7000 may be caused by delayed processing of the CPU 770.

Hence, in the setting circuit according to the seventh embodiment, the monitoring type is set when the timer provided in one of the circuit blocks is time-synchronized with an external device and a period is set as the monitoring period according to the timing of generating the interrupt signal outputted based on the timer. Thus, a failure can be properly detected in the time trigger system.

More specifically, an interrupt monitoring circuit corresponds to the interrupt signal outputted according to a predetermined schedule by the timer provided in one of the circuit blocks, the monitoring type in the setting circuit provided in the interrupt monitoring circuit is set when the timer is time-synchronized with the external device, and the monitoring period set in the setting circuit is a period corresponding to the timing of generating the interrupt signal in the predetermined schedule.

Eighth Embodiment

Figure 18:
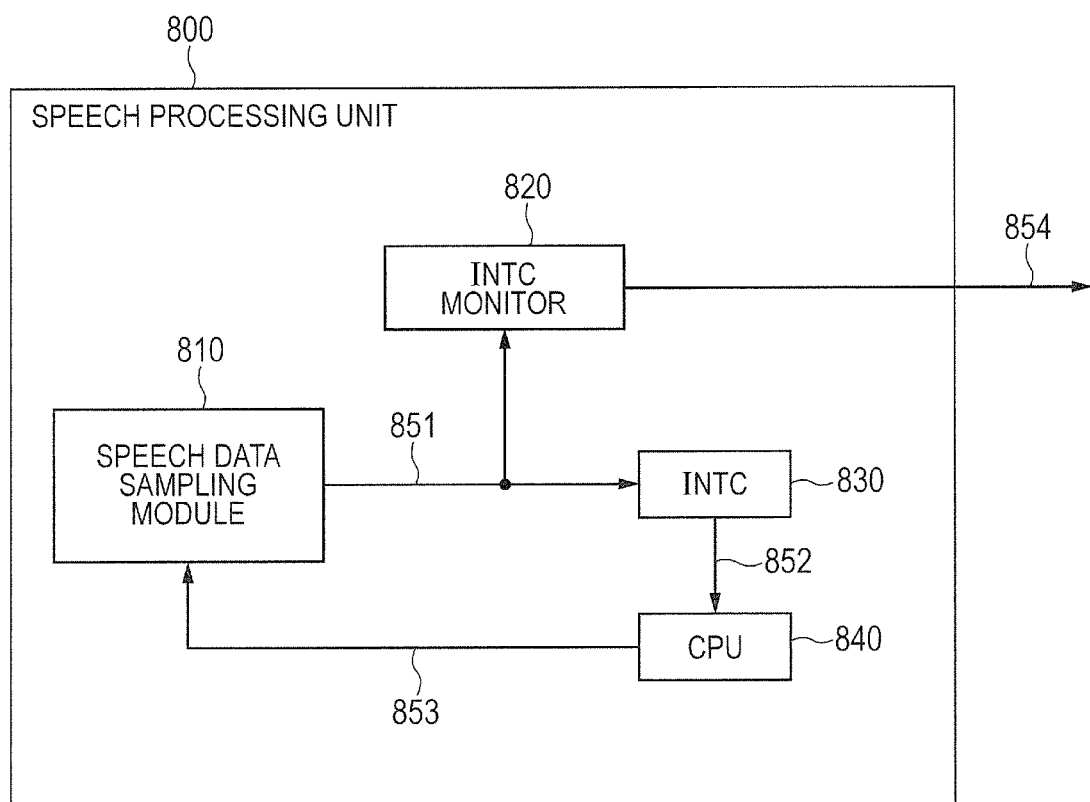
FIG. 18 is a block diagram showing the configuration of a speech processing unit according to an eighth embodiment.

An eighth embodiment is a modification of the first to fifth embodiments. Specifically, the application of the semiconductor device to a speech data processing unit will be discussed below. FIG. 18 is a block diagram showing the configuration of a speech processing unit 800 according to the eighth embodiment. The speech processing unit 800 includes a speech data sampling module 810, an INTC monitor 820, an INTC 830, and a CPU 840.

The speech data sampling module 810 typically samples speech data at 8 kHz (an interval of 125 μs). The speech data sampling module 810 performs kinds of signal processing with a speech frame of 160 samples (20 msec). Thus, the speech data sampling module 810 outputs an interrupt signal 851 to the INTC monitor 820 and the INTC 830 with the sampling period of speech data, that is, at intervals of 125 μs. The speech data sampling module 810 is an example of a peripheral IP. Moreover, the speech data sampling module 810 sets a monitoring type on the INTC monitor 820 when the input of speech data is started. The monitoring type may be set by the CPU 840.

The INTC 830 outputs an interrupt request 852 to the CPU 840 in response to the interrupt signal 851. The CPU 840 performs software processing 853 on the speech data sampling module 810 in response to the interrupt request 852.

In the INTC monitor 820, a period is set as a monitoring period (negate monitoring period 2312) according to the processing of one frame of speech data. The INTC monitor 820 monitors the interrupt signal 851. If a negate period exceeds the negate monitoring period 2312, the INTC monitor 820 detects the state as a failure and outputs a failure notification signal 854. If the speech data sampling module 810 normally operates, the interrupt signal 851 is always asserted at intervals of 125 μs. Thus, if the interrupt signal 851 is not asserted in the negate monitoring period 2312 and the negate period exceeds the negate monitoring period 2312, a failure may be present in, for example, the speech data sampling module 810.

Also when an assert period exceeds a predetermined assert monitoring period 2311, the INTC monitor 820 detects the state as a failure and outputs the failure notification signal 854. This is because the software processing 853 from the CPU 840 is performed and the interrupt signal 851 is negated in the assert monitoring period 2311 as long as the INTC 830 and the CPU 840 normally operate. Thus, in this case, a failure may be present in, for example, the INTC 830 or the CPU 840.

Hence, in the setting circuit according to the eighth embodiment, the monitoring type is set at the start of input from the speech data sampling module and a period is set as the monitoring period according to the processing of one frame of the speech data. Thus, a failure can be properly detected in sidetone processing or the like.

In other words, an interrupt monitoring circuit corresponds to the interrupt signal outputted from the speech data sampling module among circuit blocks, the monitoring type in the setting circuit provided in the interrupt monitoring circuit is set when speech data is inputted from the sampling module, and the monitoring period set in the setting circuit is a period corresponding to the processing of one frame of speech data.

Ninth Embodiment

Figure 19:
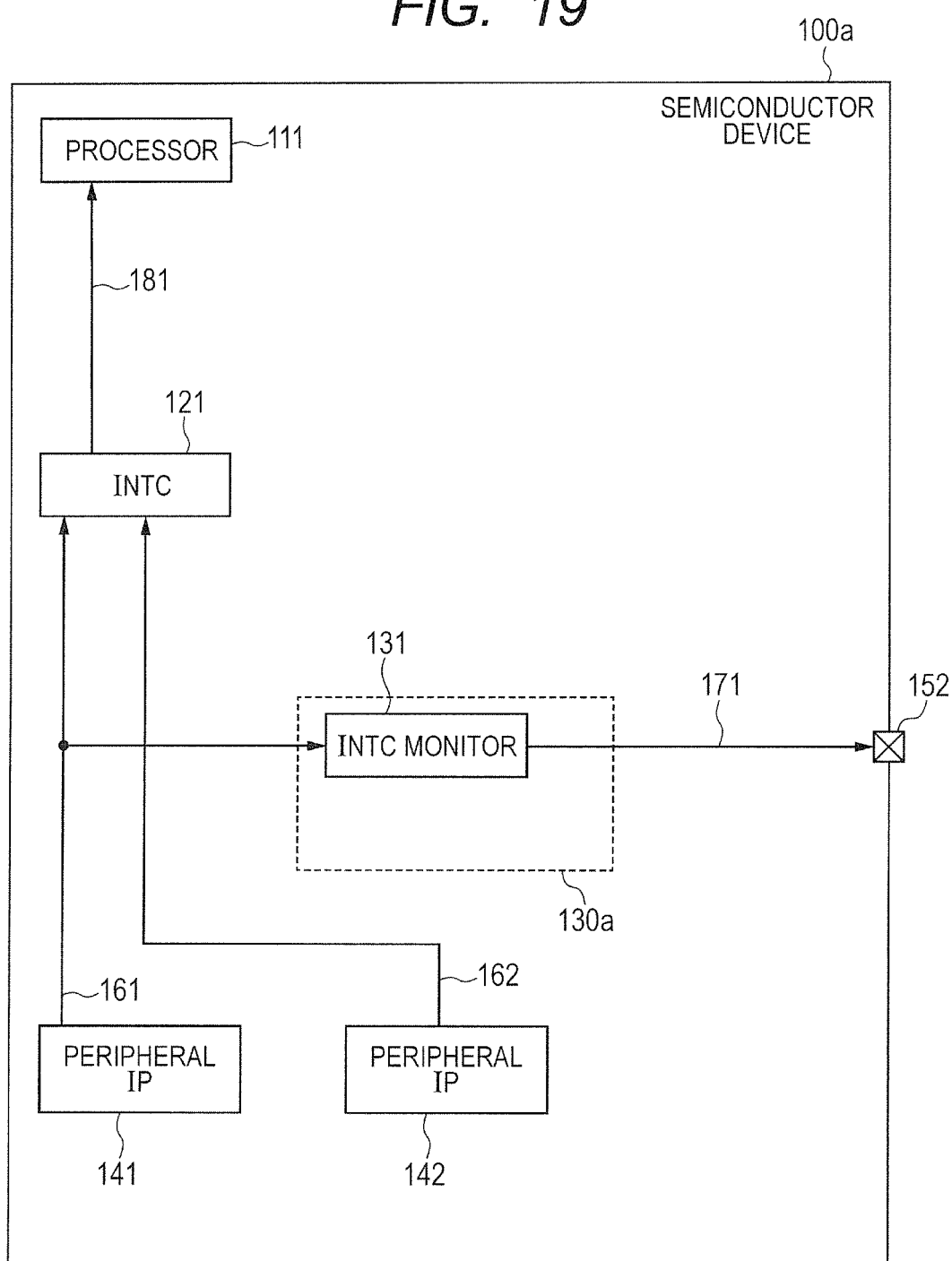
FIG. 19 is a block diagram showing the configuration of a semiconductor device according to a ninth embodiment.

A ninth embodiment is a modification of the first embodiment. FIG. 19 is a block diagram showing the configuration of a semiconductor device 100a according to the ninth embodiment. The semiconductor device 100a includes a processor 111, an INTC 121, an interrupt monitoring unit 130a, and peripheral IPs 141 and 142. In this configuration, the interrupt monitoring unit 130a includes an INTC monitor 131. The INTC monitor 131 monitors a state of an interrupt signal 161. If an abnormality is detected, the INTC monitor 131 outputs a failure notification signal 171 to an external terminal 152. With this configuration, a failure can be detected by, for example, an external monitor of the semiconductor device 100a. Other configurations are similar to those of the first embodiment.

Specifically, according to the present embodiment, the INTC monitor can be provided for at least one interrupt signal and a monitoring type and a monitoring period can be set for the interrupt signal. Thus, failures can be detected based on various kinds of errors that occur in relation to the interrupt signal.

The invention made by the present inventors was specifically described in accordance with the foregoing embodiments. Obviously, the present invention is not limited to the embodiments and various changes can be made within the scope of the invention.

What is claimed is:

1. A semiconductor device comprising:
   a first processor performing an interrupt operation in response to an interrupt request;
   a plurality of circuit blocks, each outputting an interrupt signal;
   a first interrupt control circuit receiving the interrupt signals from the circuit blocks and sending the interrupt request to the first processor; and
   a first interrupt monitoring circuit receiving an associated one of the interrupt signals,
   wherein the first interrupt monitoring circuit detects a first failure when an assert period of the associated one of the interrupt signals exceeds a first monitoring period,
   wherein the first interrupt monitoring circuit detects a second failure when a negate period of the associated one of the interrupt signals exceeds a second monitoring period, and
   wherein the first interrupt monitoring circuit outputs a failure notification signal when at least one of the first failure and the second failure is detected.

2. The semiconductor device according to claim 1,
   wherein the first interrupt monitoring circuit includes a setting circuit,
   wherein the setting circuit comprises monitoring type information indicating whether to monitor the assert period only, the negate period only, or both period of the associated one of the interrupt signals, and
   wherein the first interrupt monitoring circuit starts to monitor the assert period and the negate period of the associated one of the interrupt signals in response to the monitoring type information, in order to detect the first failure and the second failure.

3. The semiconductor device according to claim 1, wherein the failure notification signal includes information for specifying which of the first failure and the second failure has been detected.

4. The semiconductor device according to claim 2, wherein the first processor sets the monitoring type information.

5. A failure detection method of a semiconductor device, the semiconductor device including a first processor that performs an interrupt operation in response to an interrupt request, a plurality of circuit blocks that each outputs an interrupt signal, and a first interrupt control circuit that receives the interrupt signals from the circuit blocks and sends the interrupt request to the first processor based on the interrupt signals, the method comprising:
   measuring an assert period of a first interrupt signal which is output from a first circuit block of the plurality of circuit blocks;
   comparing the measured assert period of the first interrupt signal with a first monitoring period to detect a first failure;
   measuring a negate period of the first interrupt signal;
   comparing the measured negate period of the first interrupt signal with a second monitoring period to detect a second failure; and
   generating a failure notification signal when at least one of the first failure and the second failure is detected.

6. The failure detection method according to claim 5, further comprising:
   starting to monitor the assert period of the first interrupt signal in response to monitoring type information indicating to monitor the assert period; and
   starting to monitor the negate period of the first interrupt signal in response to the monitoring type information indicating to monitor the negate period,
   wherein the monitoring type information is set by the first processor.

7. The failure detection method according to claim 5, wherein the failure notification signal includes information for specifying which of the first failure and the second failure has been detected.

8. The failure detection method according to claim 6, wherein the monitoring type information is set by the first processor.

* * * * *